US012789271B2

(12) United States Patent
Horsfall et al.

(10) Patent No.: US 12,789,271 B2
(45) Date of Patent: Nov. 10, 2026

(54) SYSTEMS AND METHODS FOR CREATING DUPLICATE KEYS

(71) Applicant: iKeyless, LLC, Louisville, KY (US)

(72) Inventors: David Anthony Horsfall, Silsden (GB); Polly Crowther, Silsden (GB)

(73) Assignee: IKEYLESS, LLC, Louisville, KY (US)

( * ) Notice: Subject to any disclaimer, the term of this patent is extended or adjusted under 35 U.S.C. 154(b) by 647 days.

(21) Appl. No.: 18/193,440

(22) Filed: Mar. 30, 2023

(65) Prior Publication Data

US 2023/0390835 A1 Dec. 7, 2023

Related U.S. Application Data

(60) Provisional application No. 63/362,332, filed on Mar. 31, 2022.

(51) Int. Cl.
*B23C 3/35* (2006.01)

(52) U.S. Cl.
CPC ................ *B23C 3/35* (2013.01); *B23C 3/355* (2013.01); *B23C 2235/12* (2013.01); *B23C 2235/28* (2013.01); *B23C 2235/41* (2013.01)

(58) Field of Classification Search
CPC ....... B23C 3/35; B23C 3/355; B23C 2235/12; B23C 2235/21; B23C 2235/24; B23C 2235/32; B23C 2235/36; B23C 2235/41; B23C 2235/44; B23C 2235/48
See application file for complete search history.

(56) References Cited

U.S. PATENT DOCUMENTS 3,358,561 A * 12/1967 Roxburgh ................. B23C 3/35 409/83
3,602,092 A * 8/1971 Richens ................. B23Q 35/00 409/83
3,796,130 A * 3/1974 Gartner .................. B23C 3/355 221/92

(Continued)

FOREIGN PATENT DOCUMENTS

CA 2208437 A1 * 6/1996 ............... B23C 3/35
CA 2353165 A1 * 1/2002

(Continued)

*Primary Examiner* — Nicole N Ramos
(74) *Attorney, Agent, or Firm* — Gray Ice Higdon

(57) ABSTRACT

A “flipper” presents a key-receiving and positioning component to a user having a known key type that is not conducive to laser scanning or the like on a flat imaging glass plate; 2) a key storage system comprising a matrix of known storage cells and an automated system used to automatically identify, locate and select keys stored in the storage matrix; 3) enhanced packaging formats for storing a variety of keys for efficient picking and placing of the keys for cutting operation and a “Faux Key Blade” for use in packaging of smartkeys and OBD Dongle products that do not have a key blade incorporated therein or is a detachable feature; 4) a gripping or grabbing mechanism adapted to effectively “pull” a desired duplicate key from a known storage spot or cell among a key product storage matrix of storage cells; and 5) an effective “escrow” of collective delivery system to deliver multiple items or key products in one transaction as opposed to piecemeal transactions.

8 Claims, 19 Drawing Sheets

(56) References Cited

U.S. PATENT DOCUMENTS

| | | | | | |
|---|---|---|---|---|---|
| 4,143,582 | A * | 3/1979 | Heimann | B23C 3/35 | 409/83 |
| 5,172,829 | A * | 12/1992 | Dellicker, Jr. | G07F 17/0042 | 221/124 |
| 5,807,042 | A * | 9/1998 | Almblad | G06V 10/60 | 409/83 |
| 5,908,273 | A * | 6/1999 | Titus | B23C 3/35 | 409/83 |
| 6,152,662 | A * | 11/2000 | Titus | E05B 19/0011 | 409/83 |
| 6,406,227 | B1 * | 6/2002 | Titus | B23C 3/35 | 700/161 |
| 6,647,308 | B1 * | 11/2003 | Prejean | B33Y 80/00 | 700/120 |
| 8,128,322 | B2 * | 3/2012 | Bass | G06V 10/46 | 409/81 |
| 8,992,145 | B1 * | 3/2015 | Mueller | B23C 3/35 | 409/83 |
| 9,073,133 | B1 * | 7/2015 | Mueller | B23C 3/35 | |
| 9,149,877 | B1 * | 10/2015 | Mueller | B23C 3/35 | |
| 9,308,590 | B2 * | 4/2016 | Bass | B23C 3/35 | |
| 9,468,982 | B1 * | 10/2016 | Mueller | B65G 1/1371 | |
| 9,487,968 | B2 * | 11/2016 | Gerlings | B23C 3/35 | |
| 9,556,649 | B1 * | 1/2017 | Mueller | B23Q 3/00 | |
| 9,558,236 | B1 * | 1/2017 | Hagen | G06V 20/39 | |
| 9,586,272 | B1 * | 3/2017 | Mueller | B23C 3/35 | |
| 10,124,420 | B2 * | 11/2018 | Spangler | B23C 3/35 | |
| 10,406,607 | B2 * | 9/2019 | Gerlings | B23C 3/355 | |
| 10,737,335 | B2 * | 8/2020 | Schmidt | B23Q 35/46 | |
| 2008/0145163 | A1 * | 6/2008 | Freeman | G06Q 20/18 | 409/83 |
| 2011/0110741 | A1 * | 5/2011 | Huss | B44B 3/009 | 409/84 |
| 2012/0243957 | A1 * | 9/2012 | Drake | B23P 15/005 | 409/81 |
| 2013/0294857 | A1 * | 11/2013 | Bass | B23P 15/005 | 409/82 |
| 2013/0331976 | A1 * | 12/2013 | Freeman | G06Q 20/18 | 700/117 |
| 2015/0050094 | A1 * | 2/2015 | Gerlings | E05B 19/14 | 409/81 |
| 2016/0346847 | A1 * | 12/2016 | Gerlings | G07F 17/0014 | |
| 2017/0039447 | A1 * | 2/2017 | Mutch | B23C 3/35 | |
| 2017/0136557 | A1 * | 5/2017 | Huss | B23C 3/355 | |
| 2018/0071838 | A1 * | 3/2018 | Gerlings | B23C 3/355 | |
| 2021/0069803 | A1 * | 3/2021 | Horsfall | B23C 3/35 | |
| 2021/0154752 | A1 * | 5/2021 | Spangler | G07F 11/70 | |
| 2021/0172198 | A1 * | 6/2021 | Grice | G06V 10/145 | |
| 2021/0237175 | A1 * | 8/2021 | Robertson | B23Q 35/40 | |
| 2021/0256292 | A1 * | 8/2021 | Mutch | G06V 10/141 | |
| 2021/0260672 | A1 * | 8/2021 | Mutch | B23C 3/35 | |

FOREIGN PATENT DOCUMENTS

| | | | | |
|---|---|---|---|---|
| CN | 108140126 | A * | 6/2018 | B23C 3/35 |
| DE | 4204534 | A1 * | 8/1993 | G01B 5/20 |
| KR | 100254572 | B1 * | 5/2000 | B23Q 3/18 |
| WO | WO-9306960 | A1 * | 4/1993 | B23Q 35/102 |
| WO | WO-0157472 | A1 * | 8/2001 | G01B 11/25 |
| WO | WO-2021084490 | A1 * | 5/2021 | G01B 11/24 |
| WO | WO-2021084491 | A1 * | 5/2021 | B23C 3/35 |
| WO | WO-2021156632 | A2 * | 8/2021 | G05B 19/4093 |

* cited by examiner

SYSTEMS AND METHODS FOR CREATING DUPLICATE KEYS

INCORPORATION BY REFERENCE

The present invention relates to systems and methods for creating duplicate keys and components related to such systems. The components described herein are intended for use in connection with key cutting machines such as the machines and systems disclosed in U.S. Non-Prov. patent application Ser. No. 17/169,252 filed Feb. 5, 2021, entitled SYSTEMS AND METHODS FOR CREATING DUPLICATE KEYS (Robertson et al.), and U.S. Non-Prov. patent application Ser. No. 17/447,689 filed Sep. 14, 2021, entitled SYSTEMS AND METHODS FOR EXTRACTING KEY CODE DATA AND CONFIGURING VEHICLE KEYS (Robertson et al.), both of which are incorporated by reference herein in the entirety.

FIELD OF INVENTION

The present invention generally relates to the field of replicating, duplicating or copying keys. More specifically, the present invention relates to creating a copy of a master key based on a set of information captured from the master key. The present invention provides components for receiving a master key, positioning a master key, storing and retrieving a duplicate key product, and delivering selected and/or cut keys to a customer.

BACKGROUND OF THE INVENTION

Keys come in many formats and are used for many purposes. For example, automotive, residential and security keys are ubiquitous and come in a wide variety of form factors. Increasingly, keys are becoming more and more sophisticated with many built in features—especially in the automotive field. Increased security and feature sets leads to increased cost of keys, which, due to their size, are prone to being lost. Replacing a lost or stolen key can be expensive and replacement options are not relatively narrow. Convenience is another factor that makes replacement of keys burdensome. Among the enhanced feature set associated with automotive keys are built in vehicle remote access systems. Nearly every vehicle on the market for the past several years has included some form of keyless entry as either a standard feature or add-on option. In addition, consumers with older vehicles without remote access systems have been able to retrofit their vehicles with aftermarket systems to achieve this added benefit.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

In addition to the programming tools and software for pairing modern car keys, remotes, remote access devices, or key fobs with a vehicle, locksmiths must provide key blades that come in many types and shapes depending on the manufacturer's requirements for the ignition cylinder. Modern blades are typically milled as opposed to traditional grinding wheel approaches. Because of the variety of features and formats, blade forms, valet key access, etc., one size does not fit all in the realm of replacement keys. Accordingly, a key cutting machine must be capable of storing and performing key cutting operations on a significant set of replacement keys to appeal to and serve a broad potential customer base.

A—Positioning of Master Keys for Blade Imaging.

Key cutting machines may include scanning functions adapted to scan master keys as a prelude to or in connection with key cutting operation. Older vehicle keys that are flat in profile and residential house keys, which normally have a relatively flat profile, allow the key to be placed flat on a surface when it is to be scanned or imaged to capture information related to the key. As described in the references incorporated by reference above, processes such as single laser scanning or triple laser scanning may be used to capture the key information for flat house and automotive keys as well as properly positioned remote access-type automotive keys. This process is typically efficient and accurate when the position and orientation of the key to be captured are known and can be pre-programmed or designed for in a key duplication system.

However, for keys such as vehicle keys, car keys, key blades with an attached remote or key fob, or novelty or designer keys, the exact distance and positioning of the key blade relative to the scanning surface and to the image capture device cannot accurately be known or determined with existing systems. Because many remote access keys have base portions that are "boxy" and bulky in comparison to typical flat blades that protrude therefrom, scanning can be difficult, and the resulting imaging compromised or ineffective. Inaccurate, incorrect, or unknowable information introduces errors or discrepancies into the information captured by the master key blade image or measurement capturing device and as determined by the key duplication system resulting in a point of failure.

Accordingly, a problem exists with key cutting machines having a flat scan surface from which imaging information associated with master keys is collected. Master keys with bulky bodies are prone to error in imaging due to the undesirable angles associated with placing the key and blade on a flat glass surface. For example, flip-keys, particularly those with right angle retractable blades, present several issues: 1) because of the shape of the key, which can ultimately result in the angle of the blade being too high for triple laser scan to accommodate because the resolution of the existing cuts at the high angle is not accurate enough, 2) requiring an unfamiliar user to balance the key on its side will lead to inconsistent results, and 3) the typically rounded edge of the key leaves very little surface area in contact with the glass. Also, slight vibrations in the scanning area light box from operational motor movement can cause the key to vibrate and slide/move and result in erroneous and un-useful imaging.

What is needed is a key cutting system and method for effectively receiving and positioning a wide variety of master keys to be copied including those having "non-flat" profiles to accurately capture information from a master key to be copied.

B—Storage and Retrieval of Keys for Duplicating.

In addition to capturing master key information for cutting a duplicate key blade, a matching duplicate key blank or key product must be accurately identified, located and selected for copying. Another drawback associated with known key cutting systems, such as self-serve machines placed in big box stores or automotive and other retail stores is the confusing many customers may have in selecting the correct duplicate key for cutting. Known storage systems having a wide variety of key styles and forms can result in erroneous selection by the consumer, erroneous cutting and ultimately a replacement key that does not work properly resulting in product waste and frustration.

What is needed is a system having an effective and efficient means of storing a wide variety of keys to enable automated "picking" and "placing" or positioning duplicate key products for cutting or for delivery to a customer. What is needed is a storage system that can be associated with a program for deploying means to accurately locate and select stored keys. Further needed is an inventory or key presence means to confirm the presence of stored keys in stock and, optionally, to automatically generate an alert upon detecting the need to re-stock the key product storage component.

Another drawback is in the non-uniform or disparate packaging associated with a wide variety of key shapes and formats that does not permit for efficient key blank/product storing and effective automated selection and handling by key cutting machines.

What is needed is a packaging system capable of efficient storage of duplicate keys and consistent "picking" for retrieval from storage and placement for handling in connection with cutting operations.

A further problem with such any picking mechanism is in the instance of smart keys that have a removable emergency key that is detachable, rather than deployable (e.g., flip-key), from the remote access key, there is nothing to "grip" or "grab" by which to pick and place such key.

What is further needed is a packaging means that allows for non-key blade key types to be handled within the cutting system in an effective manner for delivery to customers. What is needed is a packaging format adapted to provide an effective means for gripping and picking smart keys that have no deployable key blade.

Another drawback with existing key cutting systems is the do not have a way to effectively pick and place a set of keys from a known storage system for automated cutting operations.

What is further needed is a mechanism to "grab," "grip" or otherwise engage and pick and place or position a selected duplicate key from a storage area for delivery to a key cutting section of the machine.

Often customers have multiple key and key product devices to order and duplicate. Another drawback of known systems is the lack of an effective way to collect the products during an ordering process for organized delivery to the customer ordering multiple products in a single transaction thereby avoiding the need for multiple transactions. A problem with multiple orders is with existing systems the key cutting machines require completion of a purchase or other transaction before delivering the finished key product to the customer to avoid theft. As a result, such prior systems process individual payment transactions even when the customer is ordering multiple products. This leads to multiple payment transactions and multiple product dispensing for customers having multiple items.

What is needed is a system and process for handling multiple item orders and dispensing the completed orders in a collective fashion to enable single transaction payment processing for completed orders.

SUMMARY OF THE INVENTION

The present invention provides a set of features and components useful in systems and methods for effectively storing and handling duplicate keys for cutting and delivery to customers. Key cutting machines involve two primary steps: 1) receive a master key for duplicating, and 2) select and position a matching duplicate key product for cutting operations.

A first aspect of the invention relates to receiving a master key for duplicating and, specifically, provides a means for presenting a key-receiving and positioning component to a user having a known key type that is not conducive to laser scanning or the like on a flat imaging glass plate. By providing an effective master key placement and positioning platform, the image scanning component of the key cutting machine can effectively capture data from a master key having an otherwise problematic shape and configuration, i.e., accurately capture information from the master key for decoding and determining a set of characteristics, such as key blade type, cut depth, bitting information, and key decoding measurements for the master key to be used in the cutting of a duplicate key from a key blank.

In one particular manner associated with the first aspect of the invention, a "flipper" or sliding means is configured to present a key-receiving and positioning component to a user having a known key type that is not conducive to laser scanning or the like on a flat imaging glass plate. Using a flat glass plate alone may result in non-flat vehicle keys being suspended above the surface of the glass by the head of the key, the fob, or remote. When the vehicle key, which is the master key to be copied, is placed on the scanning surface it may not be possible using the key outline or silhouette of the key blade to determine if the key is raised above the glass. In this situation, the key blade would be closer to the camera than the imaging device, e.g., a laser scanner, would be expecting. This also causes the key blade to appear larger to the camera and would result in incorrect measurements of the key blade. The laser in a laser scanner would miss a targeted spot on the key blade by the same distance that the key blade is positioned above the glass. The laser scanner may miss the widest part of the key blade and capture an incomplete 3D profile of the key blade where there is a deep cut or bit or where there are no grooves in the key blade. By presenting a user with a receptacle or receiving means for positioning such a non-flat key in a position known by the cutting machine, accurate imaging can be achieved to avoid product waste and frustration by the user.

A second aspect of the invention relates to selecting and positioning a matching duplicate key product for cutting operations. Specifically, the second aspect of the invention provides a duplicate key storage system comprising a series of known storage spots or cells. More particularly this aspect of the invention provides a pigeonhole or honeycomb matrix of storage cells. In this manner, an automated system may be used to automatically identify, locate and select keys stored in the storage matrix. A program or set of executable instructions stored in a memory and executed by a processor may be implemented in connection with an electro-mechanical key product "picking" device for automated pulling of product from the storage matrix. This program may be further adapted to control or operate the electro-mechanical key product "picking" device to accurately place or position the key product for cutting or duplicating based on a master key. In addition, the storage matrix system may include an inventory or key presence detection means operating in connection with a set of instructions executable by the processor to confirm the presence of stored key blank products in stock and available for cutting. Optionally, the inventory maintenance system may be adapted to automatically generate an alert upon detecting the need to re-stock the key product storage component. The inventory system may include one or more sensors and/or one or more optical or image-based components that monitor presence of at least one key product in each cell of the storage matrix. The product sensing component may be further adapted to monitor a precise number of available products. A set of data structures and program instructions associated with the storage matrix system may be accessible over a communications network, e.g., over the Internet via a wired/wireless network. This may enable the inventory function to communicate with remote systems to alert a central facility to the need to replenish key product inventory and to track usage data for planning purposes. The inventory system may be adapted to base product availability upon a known or input number and adjust the number based on product deployment to customers and on replenishment.

A third aspect of the invention provides enhanced packaging formats for storing a variety or system of keys for efficient picking and placing of the keys for cutting operation. Key products come in a wide variety of shapes and dimensions presenting challenges for storing and selecting keys in an automated fashion. This aspect of the invention provides for a set of uniform product packaging in which each of the set of packaging formats is adapted to store a set of key blank products. The storage matrix is configured to provide a first set of storage cells configured to receive key products stored in a first packaging format and a second set of storage cells configured to receive key products stored in a second packaging format. For efficiency, each of the sets of storage cells are closely configured to correspond to the dimensions of the respective packaging format to avoid wasted space in the storage matrix. In this manner a maximum number of products may be stored. There will be an acceptable degree of tolerance to ensure the packaging format is well received in the appropriate storage cells of the storage matrix. Although automotive keys come in a wide variety of dimensions and form factors, one typical characteristic or feature is the existence of an elongated key blade member that extends from a key fob or key base or in flip-fashion from a smart key remote access base. Accordingly, much of the packaging configuration is directed to providing a "hole" or opening through which a key blade extends outward from the packaging and, once packaging is in final form, is exposed for use in key cutting operations, e.g., for pick and place by the gripper mechanism as described herein.

One additional feature of the packaging inventive aspect is the provision of a "Faux Key Blade" for use in packaging of smartkeys and OBD Dongle products that do not have a key blade incorporated therein or is a detachable feature. The faux blade is, in one manner, a plastic blade that acts as the key blade for keys/products that do not have a physical key blade. These products include smartkeys and programming dongles. In one manner, the blade extends through one side of a "tuck" carton-type packaging and is sandwiched between flaps and the folded cover of the carton.

The particular layout of the storage matrix and dedicated sets of storage cells is preferably based on an optimal set of products based on anticipated demand for the key products. Optionally, the storage matric may be reconfigurable in the field or otherwise to allow for changes to packaging formats and key product demand. A corresponding change to the program associated with the storage matrix will provide the necessary reconfiguration of the matrix mapping, e.g., in the look-up table, stored in the resident memory of the key cutting machine. With the storage matrix having a known configuration of storage cells, the gripper mechanism described herein is informed as to the precise location of the stored key product for picking. In this manner this aspect of the invention provides a packaging system capable of efficient storage of duplicate keys and consistent "picking" for retrieval from storage and placement for handling in connection with cutting operations A fourth aspect of the invention provides a gripping or grabbing mechanism adapted to effectively "pull" a desired duplicate key from a known storage spot or cell among a pigeonhole or honeycomb matrix of storage cells. The electro-mechanical device mentioned above may be in the form of a gripping mechanism, i.e., a gripper device. For example, the gripper device may have a pair of opposing arms and/or prongs adapted to access key products stored in the key storage matrix and is operated to avoid contacting other keys when locating and "pulling" or "picking" selected key blank products for further operations, e.g., cutting. The prongs may be opened and closed during the process of engaging with the key blank product and other components of the key cutting machine. A series of gears, actuators, arms, levers and other components may comprise the gripper mechanism and it may operate much like an articulating arm in moving forward and backward, side to side relative to the products stored in the key storage matrix. The matrix may be plotted, e.g., via a look up table stored in the memory accessible by the executable program, and upon identification of a key product for duplication the corresponding cell or storage location is determined and the gripping mechanism is deployed to the associated storage cell to pick the corresponding key blank product. The program then commands the gripper mechanism to deliver the "picked" key blank product to the blade cutting section of the key cutting machine.

A fifth aspect of the invention provides an effective "escrow" of collective delivery system to deliver multiple items or key products in one transaction as opposed to piecemeal transactions. What is needed is a system and process for handling multiple item orders and dispensing the completed orders in a collective fashion to enable single transaction payment processing for completed orders A first embodiment of the present invention provides a method for making duplicate keys comprising the following steps: determining a master key to be duplicated is a flip-key type having a key blade not easily scanned over a scannable surface; moving a retractable key slot into a position to receive a blade associated with the identified master flip-key; receiving the master flip-key key blade into a slot configured to receive and support a flip-key type key blade and positioning the received master flip-key key blade in a desired position over the scannable surface; and capturing image data of the flip-key type master key.

A second embodiment of the present invention provides a key cutting machine for making duplicate keys, the key cutting machine comprising: a key storage matrix comprising a mapped system of storage cells for storing key products; a key product retrieval system comprising at least one motor or actuator for selectively moving a gripper mechanism along a two-dimensional axis to a target cell location along the key storage matrix to pick a target key product known to be stored in a storage cell associated with the target cell location; each storage cell adapted to contain a single packaged key product for accessing by the key product retrieval system; wherein the storage matrix comprises a first set of storage cells configured to receive key product packaging of a first format and a second set of storage cells configured to receive key product packaging of a second format different than the first format, the first set of storage cells having a first dimension set corresponding to the first format, and a second set of storage cells having a second dimension set corresponding to the second format. The key cutting machine may further be characterized in the retrieval system further comprises a first track oriented along a horizontal axis and a second track oriented along a vertical axis and wherein the storage cells are mapped to points along the horizontal axis and vertical axis.

In a third embodiment the invention provides a packaging system for use in connection with a key storage matrix comprising a plurality of storage cells, the packaging system comprising: a first package having a first format having a first set of dimensions and configured to accommodate first set of key products; a second package having a second format having a second set of dimensions and configured to accommodate a second set of key products, the second format being different than the first format, the second set of dimensions being different than the first set of dimensions and the second set of key products being different that the first set of key products; each of the first and second package having a blade access through which a key blade of a key product contained in the package extends whereby at least a portion of the key blade is exposed and outside the package; wherein the first package set of dimensions is configured to closely match at least two dimensions of a first set of storage cells in a storage matrix and the second package set of dimensions is configured to closely match at least two dimensions of a second set of storage cells, whereby the first package format is capable of being received in a close-fitting but removable fashion within the first set of storage cells and the second package format is capable of being received in a close-fitting but removable fashion within the second set of storage cells. The packaging system may further be characterized in a faux blade insert adapted to be received in and through the blade access of a first or second package and whereby at least a portion of the faux key blade insert is exposed and outside the package.

In a fourth embodiment the invention provides a key cutting machine for making duplicate keys, the key cutting machine comprising: a key product retrieval system comprising: a gripper mechanism comprising a set of jaw members for receiving a key blade, an actuator for causing the pair of jaw members to reposition relative to one another between an open and a closed position, a key blade positioner adapted to position a key blade received by the jaw members in a desired orientation; at least one motor or actuator for selectively moving the gripper mechanism along a two-dimensional axis to a target cell location along a key storage matrix to pick a target key product known to be stored in a storage cell associated with the target cell location; a set of key products stored in a set of storage cells of the key storage matrix, the set of key products comprising packaging characterized by at least a portion of a key blade of a key product extending outward from the key product package and accessible by the gripper mechanism.

In a fifth embodiment the invention provides a key cutting machine for making duplicate keys, the key cutting machine comprising: a key product escrow system comprising: a motor or actuator operated to move a key product conveying unit along a track or gantry to deposit transported products into one or more bins; a set of bins comprising: an escrow delivery bin adapted to receive keys after a cutting operation; a return bin adapted to receive products determined to be non-deliverable; and a delivery chute adapted to deliver key products to customers; wherein the escrow system processes multiple key order items in a combined transaction.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention but are intended to be exemplary and for reference.

DETAILED DESCRIPTION

Figure 1A:
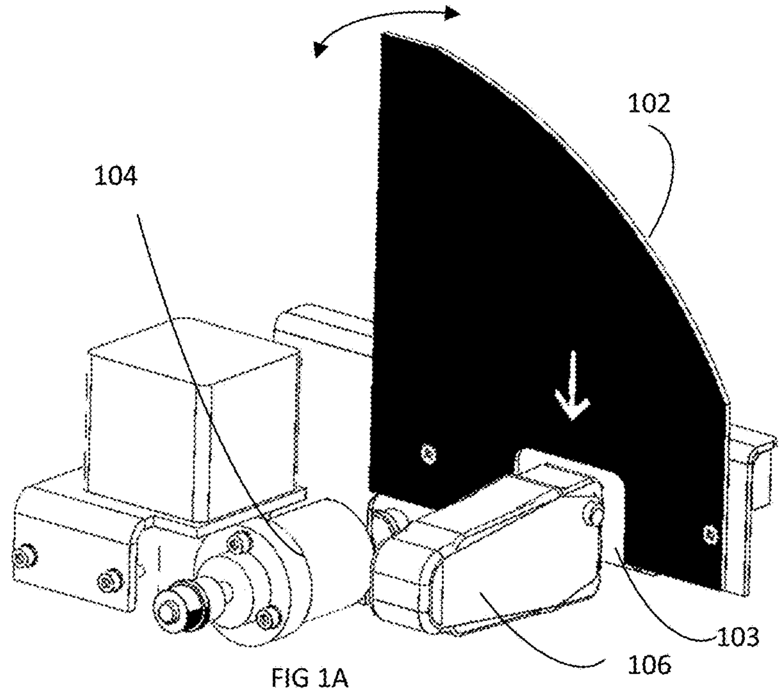
FIGS. 1A-1C provide a set of views of a flipper door or plate for use in a key cutting kiosk according to the flipper door or plate inventive aspect.

The present invention will now be described in more detail with reference to exemplary embodiments as shown in the accompanying drawings. While the present invention is described herein with reference to the exemplary embodiments, it should be understood that the present invention is not limited to such exemplary embodiments. Also, while the exemplary embodiments describe use of lasers, this is not limiting to the invention and one possessing ordinary skill in the art would understand the invention may be used in connection with other suitable means of presenting accurate and repeatable "lines" or "stripes" onto key structures discernable by a camera in connection with the processes described in detail hereinbelow. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following detailed description is directed to a set of inventive aspects that are used in connection with key cutting machines or kiosks such as located at so-called "big box" stores or automotive retail stores and other retail outlets. Functioning and operational features associated with such machines are described in patent applications filed by iKeyless, LLC of Louisville, Kentucky. For instance, replacement or duplicate keys may directly replicate or emulate all features of the vehicle OEM key or may include additional features unique to a universal remote head key ("URHK"). A URHK is a universal key that combines a key fob/keyless entry system, transponder, and key blade into a single unit that may be programmed and configured to operate with a wide range of vehicle makes and models. URHKs and the systems and methods for programming them are described in U.S. patent application Ser. No. 14/165,922, filed Jan. 28, 2014 (patented as U.S. Pat. No. 10,115,255) entitled METHOD AND APPARATUS FOR IMPLEMENTING MULTI-VENDOR ROLLING CODE KEYLESS ENTRY SYSTEMS (Johnson et al.), which is incorporated by reference herein in its entirety. Methods and systems for dongle-based key pairing and programming are described in U.S. patent application Ser. No. 16/947,892 filed Aug. 23, 2020, entitled SYSTEM AND METHOD FOR PAIRING A KEY WITH A VEHICLE VIA A VEHICLE COMMUNICATIONS PORT BY A DONGLE (Johnson et al.), which is incorporated herein by reference in its entirety. Replacement or duplicate keys and related information may be stored in a "key bank" such as described in U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which is incorporated herein by reference in its entirety. Another system for processing information related to master keys for duplicating is described in U.S. patent application Ser. No. 16/898,251 filed Jun. 10, 2020, entitled SYSTEMS AND METHODS FOR CREATING REPLACEMENT VEHICLE KEYS (Determann et al.), which is incorporated by reference herein in its entirety. An additional system for providing key duplication processing information related to master keys for duplicating is described in U.S. Provisional Patent App. 62/970,419 filed Feb. 5, 2020, entitled SYSTEMS AND METHODS FOR CREATING REPLACEMENT VEHICLE KEYS (Determann et al.), which is incorporated by reference herein in its entirety.

Retail and commercial machines for the copying of residential keys may include many automatic or semi-automatic systems. Several such systems and methods are described in at least U.S. Pat. No. 11,065,697 issued Jul. 20, 2021, entitled KEY CUTTING APPARATUS (Horsfall et al.), which discloses use of a two-axis gantry system for "picking and placing" residential keys retrieved from cartridge stacks for cutting; U.K. Patent Application No. 201809157, filed Jun. 5, 2018, entitled KEY BLANK DISPENSING SYSTEM (Horsfall et al.); in U.K. Patent Application No. 201806414, filed Apr. 19, 2018, entitled KEYS (Horsfall); in U.K. Patent Application No. 201708957, filed Jun. 6, 2017, entitled KEY BLANK DISPENSING SYSTEM (Horsfall et al.); in U.K. Patent Application No. 201509700, filed Jun. 4, 2015, entitled IMPROVEMENTS IN OR RELATING TO KEY CUTTING AND KEY CUTTING APPARATUS (Horsfall et al.); in U.K. Patent Application No. 201607933, filed May 6, 2016, entitled IMPROVEMENTS IN OR RELATING TO KEY CUTTING AND KEY CUTTING APPARATUS (Horsfall et al.); in U.S. patent application Ser. No. 16/567,912, filed Sep. 11, 2019, entitled KEY CUTTING APPARATUS (Horsfall et al.); and in U.K. Design Application Nos. 4039724 and 4039725, entitled "MY KEY MACHINE Devices; Mikey the Robot Device" (Horsfall), all of which are incorporated by reference herein in their entirety.

Further systems and methods from using a laser or light stripe generating device for use in key cutting processes are described in U.S. Pat. No. 6,065,911, issued May 23, 2000, entitled METHOD AND APPARATUS FOR AUTOMATICALLY MAKING KEYS, which is incorporated by reference herein in its entirety.

Now the following detailed description, with reference to the various figures included herewith, is directed to inventive aspects including: 1) a "flipper" or sliding means or screen or plate is configured to present a key-receiving and positioning component to a user having a known key type that is not conducive to laser scanning or the like on a flat imaging glass plate; 2) a duplicate key storage system comprising a series of known storage spots or cells such as a pigeonhole or honeycomb matrix of storage cells; 3) enhanced packaging formats for storing a variety or system of keys for efficient picking and placing of the keys for cutting operation and a "Faux Key Blade" for use in packaging of smartkeys and OBD Dongle products that do not have a key blade incorporated therein or is a detachable feature; 4) a gripping or grabbing mechanism adapted to effectively "pull" a desired duplicate key from a known storage spot or cell among a pigeonhole or honeycomb matrix of storage cells; and 5) an effective "escrow" of collective delivery system to deliver multiple items or key products in one transaction as opposed to piecemeal transactions. In connection with one or more of the inventive aspects, a program or set of executable instructions stored in a memory and executed by a processor associated with a key cutting machine may be implemented to provide an automated system used to automatically identify, locate and select keys stored in the storage matrix. Moreover, a program may be used to operate an electro-mechanical key product "picking" device for automated pulling of product from the storage matrix. This program may be further adapted to control or operate the electro-mechanical key product "picking" device to accurately place or position the key product for cutting or duplicating based on a master key. Many additional features associated with one or more of the inventive aspects are described below.

Figure 1B:
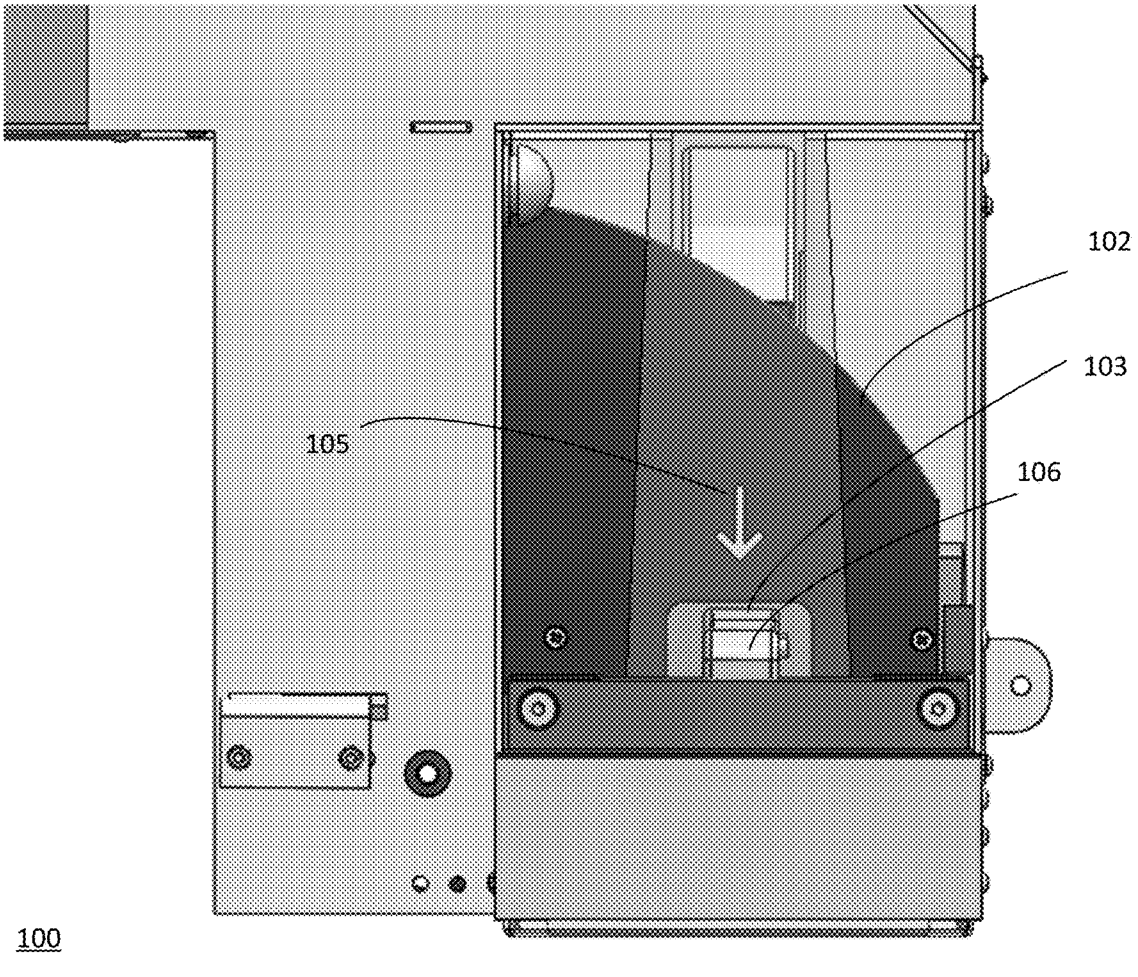
Figure 1C:
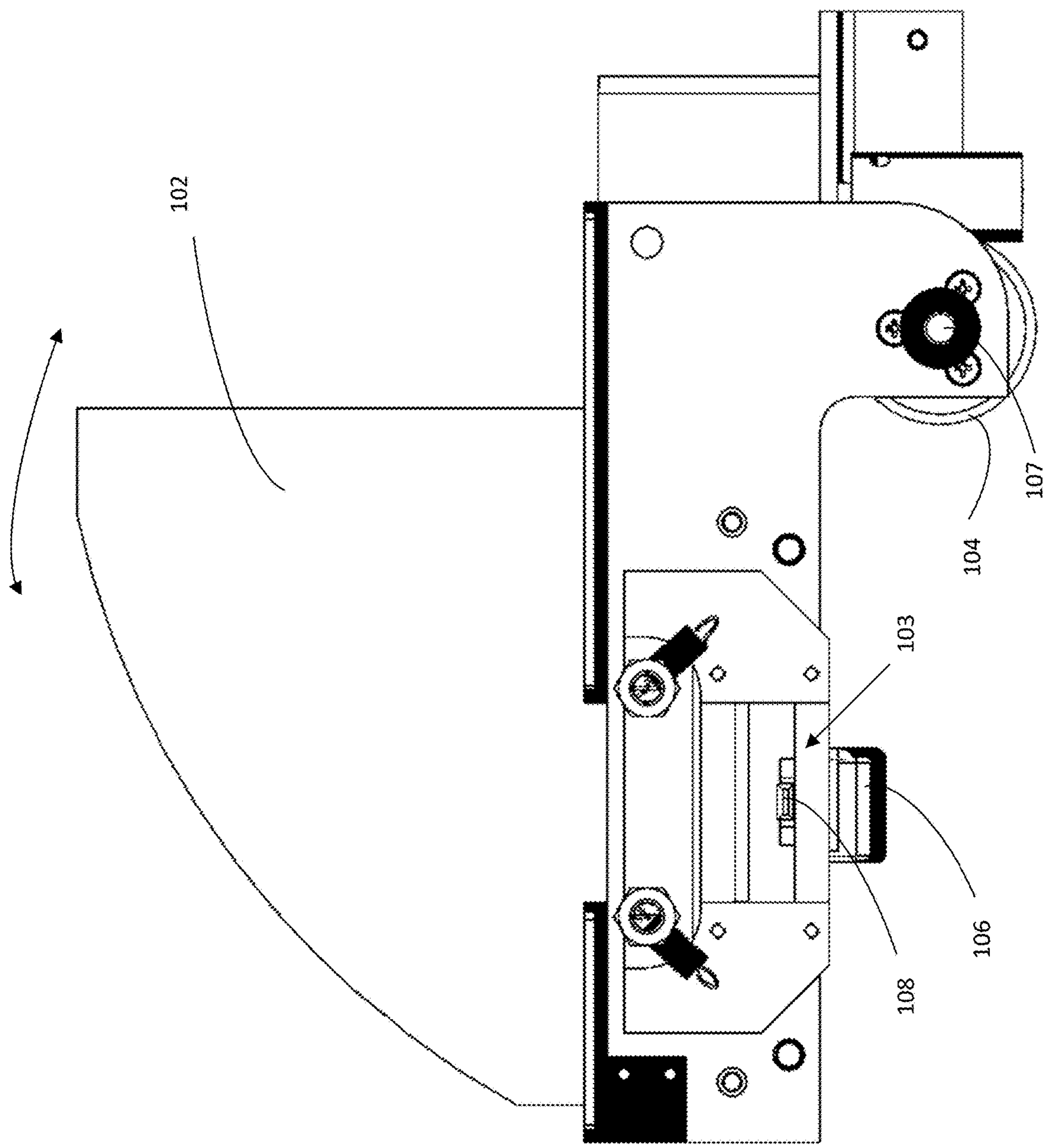

With reference to FIGS. 1A-1C, a set of views illustrate a flipper door or plate or screen for use in a key cutting kiosk according to the flipper door or plate inventive aspect. Referred to generally as a "Flipper" mechanism, the configuration at the master key scanning portion or chamber of a key cutting machine provides an Improved Positioning of Master Keys for Accurate Blade Imaging. As shown, the Flipper is essentially a key slot within a housing where all of the key blade is within the housing. The Flipper mechanism is in one form an electromechanical arm that swings or rotates or pivots down into the scan chamber, presenting a slot or opening or hole for the user to stick or insert the master key into for image capture and copying. Preferably, the Flipper mechanism is normally maintained in a retracted position and is extended or pivoted and used only for scanning those automotive master keys that have their blades perpendicular to their heads. This is because such keys will not balance properly on the scanning glass and therefore imaging or scanning process may be disallowed or compromised leading to inaccurate images or scans of the master key blade resulting in defective duplicates. Some so-called "flip-keys" have right angle blades that ore typically spring-based and when deployed pivot about a point from a retracted position to a deployed position. Because many such keys are stored in a retracted position with the blade parallel with and along the side of the key base the key blade when deployed is at a right-angle to the base and when laid on a flat scanning plate the blade is positioned with the blade edge against the scan plate. Accordingly, the cut markings or bitting pattern on the blade is not presented well for scanning purposes. Among the considerations presented with such keys are: 1) the shape of the key can ultimately result in the angle of the blade being too high for triple laser scan to accommodate because the resolution of the cuts at the high angle is not high enough; 2) requiring an untrained user to balance the key on its side during scanning is not ideal and is usually unrealistic and leads to user frustration; and 3) the rounded edge of the key leaves very little surface area in contact with the glass. Also, slight vibrations in the light box from key machine motor movement can cause the key to vibrate and slide or move along the scanning plate. The flipper mechanism addresses the above issues and is preferably only used if the selected SKU has a right-angle blade.

As shown in FIGS. 1A-1C, a key scanning section or chamber is outfitted with a flip-key holder mechanism or assembly 100 comprised of a rotating or pivoting or sliding shield, plate, door, or flipper 102 (referred to generally as flipper 102) having a key blade receiving slot mechanism 103 provided therein or attached thereto or otherwise coupled therewith. In this example the door 102 is shaped like a shark-fin and has a cutout portion with opening dimensions sufficient to provide full clearance of the key head or base or body portion adjacent the blade to enable the key and key blade to penetrate the thickness of the flipper 102, i.e., the body does not abut the wall of the flipper. In this manner, the key may be inserted into the scanning chamber without the flipper obscuring part of the key blade closest or proximal to the key head or base or body from which it extends. If the key head or body or base abutted the face of the flipper 102 then the proximal-most portion of the blade as determined by the thickness of the flipper would be obscured and unscannable. In this manner the flipper does not obscure part of the key blade during scanning. The key head or base or body portion does abut the receiving slot mechanism 103, which preferably has a plate thickness of about 4 mm but importantly a thickness that does not present a significant detriment to the scanning process, i.e., lets sufficient length of the key blade into the chamber for effective and accurate imaging and/or scanning. As shown in FIG. 1C, key blade receiving slot mechanism 103 is spring biased by springs 110 (shown disconnected but normally connected to retention members). In this manner, the spring plate associated with key blade receiving slot mechanism 103 presses down on the key blade 108 inserted into the slot. Pressing down on both sides of the slot provides an improved configuration for receiving key blades of different dimensions and configurations for proper positioning and scanning. When a master key 106 is identified (MKID) (e.g., by user inputs via GUI displayed on the key cutting machine) as being associated with a type that has a right-angle blade 108, then the machine causes the door 102 to rotate or slide into place to present a user with the preferred scanning position for the SKU identified. As shown in this example, after a right-angle blade master key is identified, the machine causes a motor 104 to rotate, slide or otherwise move the door 102 in place in the scanning chamber or area. The slot 103 is presented at the glass height to ensure ideal height. In one manner, the flipper slot 103 is not on the outside of the machine (enclosure) but inside the vision or scanning chamber of the machine. As shown in the figures, key blade 108 of key 106 is inserted into flipper slot 103. In one manner, the key blade thickness may be set, e.g., to a maximum of 5 mm, and the width may be set as well. Both the height and the width may be increased or decreased to adapt to preferred configurations. An example of a right-angle blade flip-key is shown at FIGS. 3C and 3D.

The flipper 102 is also a visual indicator to encourage the user to use the flipper and in this instance includes an arrow marking 105 pointing to the slot 103. The flipper is actuated by a motor 104, e.g., a worm gear drive, to prevent user from moving it. The motor 104 causes the door or flipper 102 to rotate about an axis at pivot point 107. In the alternative, the door or flipper 102 could slidingly move left and right or up and down to move into position for receiving a right-angle blade. A capture feature may be included in the flipper mechanism 100 to 1) locate the outside edge of the flipper door 102 on actuation, 2) prevent over rotation of the flipper 102, and 3) prevent force of key insertion from user bending the shark fin door 102. The flipper slot/opening 103 may be controlled by a floating plate. In one exemplary configuration, the full slot thickness can obscure nominally 4 mm (and up to 6 mm) of the blade length, e.g., blade 108 of key 106. Two springs balance the forces on the key 106 to maintain desired position for scanning. Spring placement should be located to avoid interference with camera view.

Although it is not necessary for automotive keys to identify head shape or button configuration to help with identification (MKID), the key cutting machine may include a configuration adapted to include a flipper design to permit capturing or using the button surface view and could update the database to use the side view information.

Figure 2A:
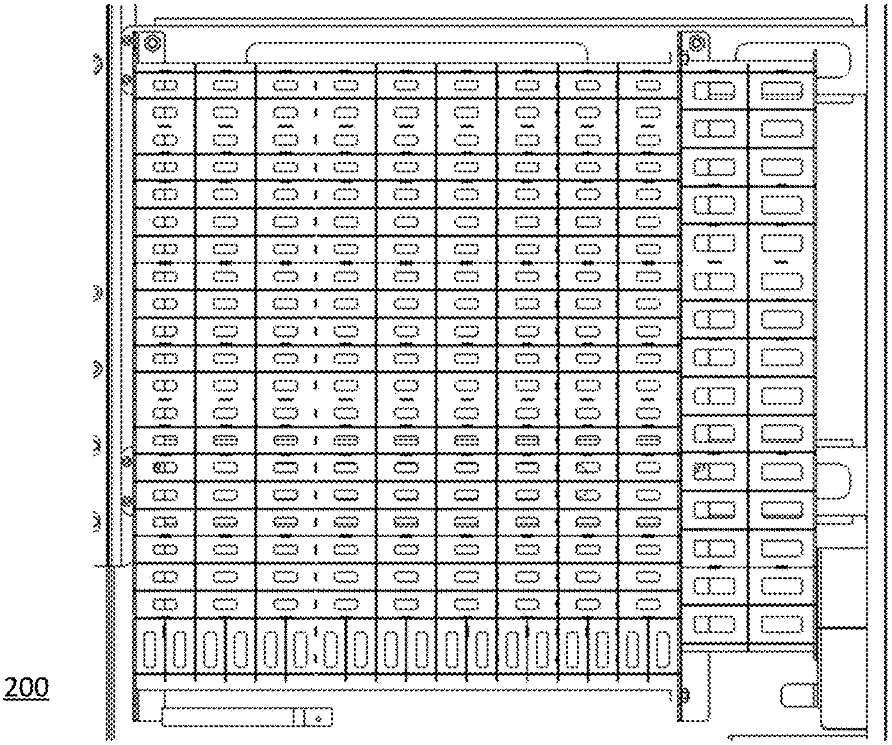
FIGS. 2A-2E provide a set of views of key blank storage matrix and inventory system for use in a key cutting kiosk according to the key blank storage matrix and inventory inventive aspect.
Figure 2B:
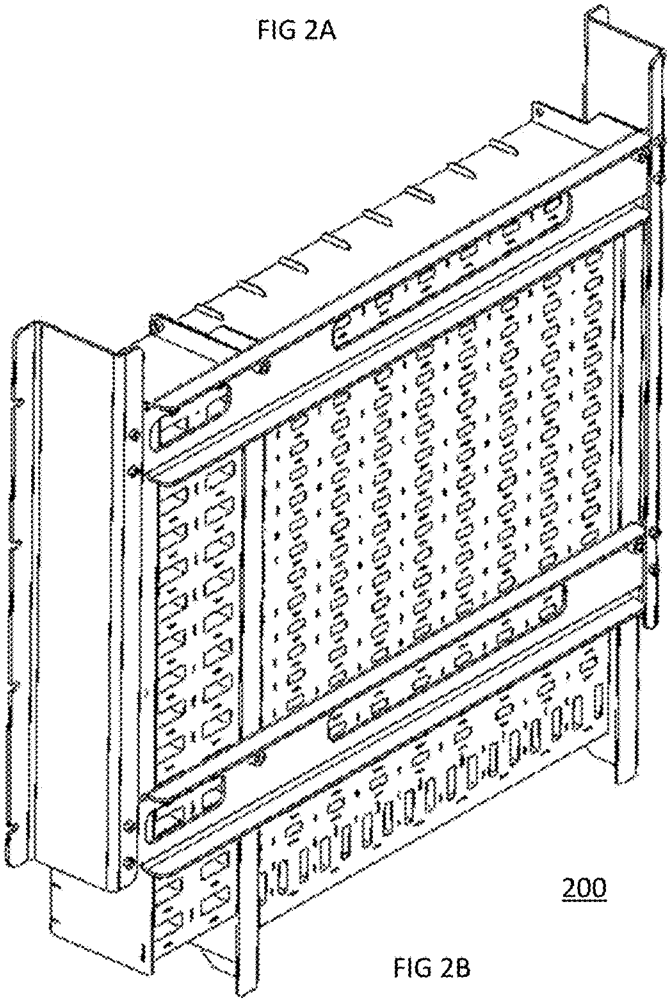
Figure 2C:
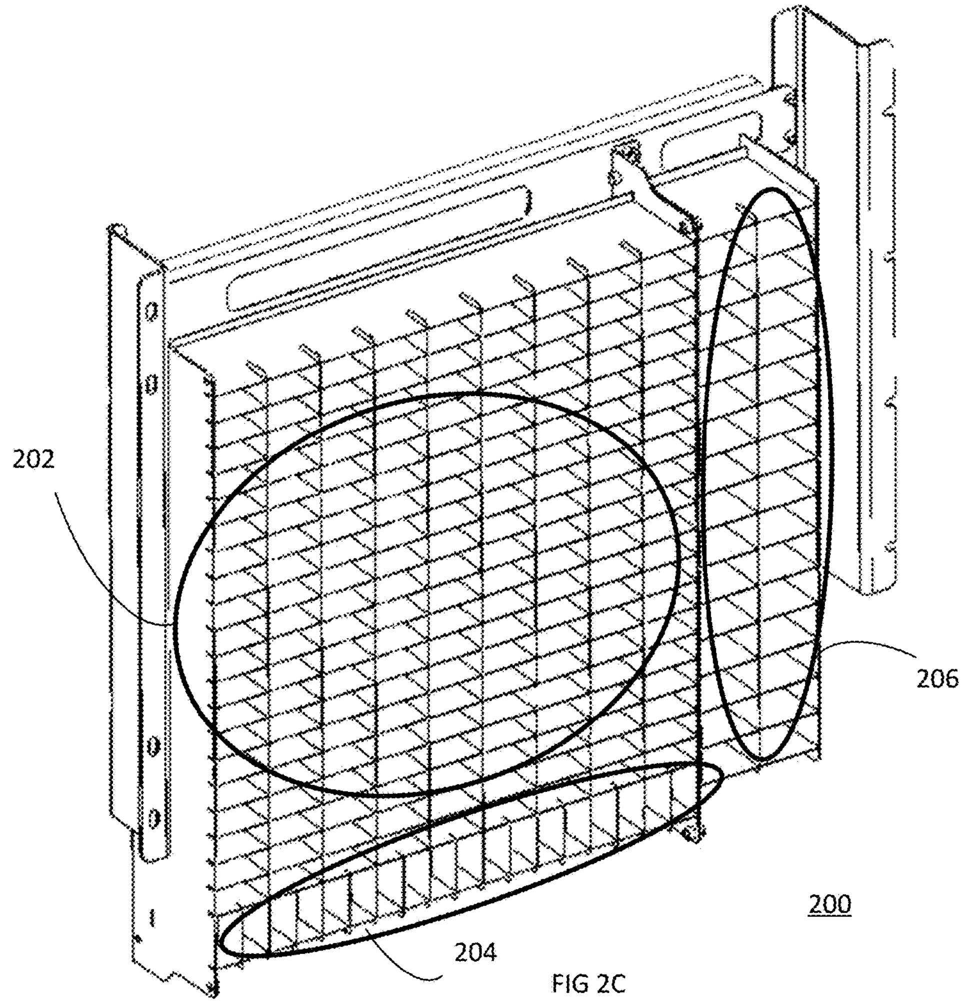

With reference to FIGS. 2A-2E, a set of views illustrate an automotive key blank/key product storage matrix and inventory system for use in a key cutting kiosk according to the key blank storage matrix and inventory inventive aspect. Not shown in FIGS. 2A-2E is an optional additional section for residential keys that are stored in stacked manner in cartridges for "pick and place" by a separate residential key gripper mechanism. Because residential keys are generally flat (cylinder keys named for the cylindrical locks in which they are received) and lever keys are also "stackable", such keys may be stacked in cartridges. In this manner, and as described in detail in U.S. Pat. No. 11,065,697, the residential gripper component operates on a gantry to a location known and associated with a stack of keys. The gripper engages a key ejection lever causing the cartridge to eject a queued key into the waiting residential key gripper in which the key is held in place by spring biasing members. Unlike the cartridge arrangement used with residential keys, the key storage matrix 200 of the present invention provides a discrete location along the matrix for each product, not a location common to a stack of like products. As shown in FIGS. 2A-2E, a key storage matrix 200 is shown in a "Pigeonhole" Wall/Bin Matrix configuration comprising sets of key product slots or storage cells. Pigeonhole matrix for storage of boxes, each pigeonhole or cell contains a single packaged key product for delivery to the customer, e.g., after undergoing a key blade cutting process based on a scanned master key. As shown in FIG. 2C, the matrix 200 includes or comprises multiple sets of storage cells configured to receive key packaging in a variety of formats and as shown in a generally X-Y axis, two-dimensional layout with rectangular openings and depths to receive key product cartons or boxes. As shown, a set of rectangular cells 202 having a first dimension set (representing a set of dimensions height×width×depth), a second set of rectangular cells 204 having a second dimension set, and a third set of rectangular cells 206 having a third dimension set. Each key box has a blade protruding into the path of a key blade or key product "Gripper" on a gantry as described elsewhere herein in detail. Some keys have blades that are parallel to the key body or base or head and some keys have blades that are perpendicular to the key body or base or head. There are also key products that do not have key blades at all, e.g., use of faux blades for OBD programming dongles or smart keys with separate emergency key blades. The matrix is configured to accommodate variations in key product carton or package configurations and allowances for proper orientation of the extending key blade or faux key blade where necessary to effectively present key products for picking by the gripper function, described herein elsewhere in more detail. Although the pigeonholes or cells are shown as rectangular in shape and this shape does have certain dimensional qualities that make for an efficient matrix system, the cells may be honeycomb-shaped or other complimentary shapes. To minimize wasted space, the product packaging and cells should be configured to have tight tolerance but not so tight as to cause difficult in an extraction or pulling process when removing the key products from the matrix.

In the exemplary embodiment of the present inventive aspects, key product packaging is configured to allow the key blade to extent, exposed, from the packaging and protrude from the matrix. In this manner the exposed blade may be used as a handle for picking the key box out of the pigeonhole/storage cell and delivering or transferring it to the clamping mechanism that holds the key during cutting. As described in more detail below, products that have emergency blades (i.e., smartkeys) and other non-blade products stored in the matrix 200 may have a different package for the smartkey itself without the blade and a separate package for the emergency key itself, which would extend from the packaging. This is to allow us to cut the emergency blade and to just dispense the smartkey. As described below, the smart key package may include a faux blade to provide a handle for gripping and picking.

As shown in FIG. 2C, the pigeonhole matrix wall 200 is made of different pigeonhole configurations: 1) Automotive Key Assembly type cells (Collar Style 202 and Perpendicular Style 204); and 2) Dongle style Assembly 206. Each assembly section is expandable in both x and y directions for the desired mix. Each assembly could theoretically be broken into individual rows/columns and is configurable to provide a wide range of cell size. The smaller the cell size, the greater potential number of cells and the greater number of key products stored in matrix 200. Cells are preferably rectangular and sufficiently rigid.

Figure 2D:
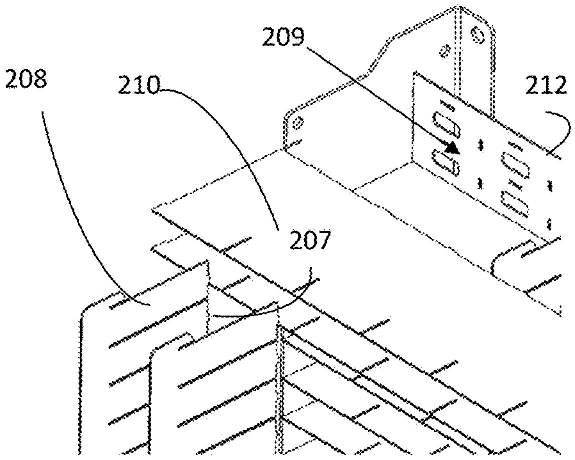
Figure 2E:
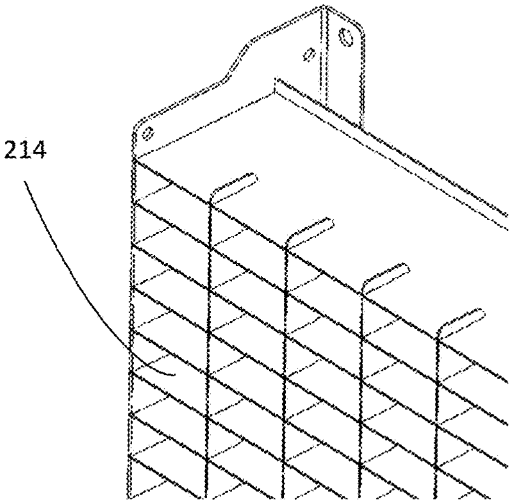

As shown in FIGS. 2D-2E, a set of vertical wall members 208 include cutouts or slots to receive and be combinable with corresponding slots formed in horizontal wall members or row elements 210 to form the matrix of cells 214. The rear edge of the vertical wall members 208 includes tabs 207 configured to engage with receiving niches 209 provided along the back wall 212 of the matrix 200. This exemplary slotted and tabbed design provides an easily reconfigurable yet stable and solid cell structure in the matrix 200. In addition, tack welding may be used, e.g., on vertical tabs and a minimum number of welds on the row elements on the abutment with the back wall 212. The vertical walls 208 are the primary structural elements that capture the rear wall 212 and the horizontal elements 210. Over-welding is costly because of labor, can also introduce dimensional errors stresses from thermal expansion. Rectangular cutouts at niches 209 on rear wall 212 of pigeonhole matrix 200 provide the following advantages: reduces weight, allow hole for sensor, pusher, and/or indicator placement or action, calibration locations, e.g., located at corners, use electrical probe on the pick and place assembly (gripper), use same algorithm to locate individual cells, and each blade can have a separate X and Y axis offset. Spacer elements or protrusions or adjustable tabs may be provided to act as a "back stop" to maintain a desired depth of key product package placement into the depth of the cells 214.

With reference to FIGS. 3A-3L, a set of views illustrate key blank product packaging for placement and storage in the storage matrix 200 of a key cutting kiosk according to the key blank product packaging inventive aspect. Because of the small nature and varied sizes and formats or automotive keys, packaging of the replacement key products is critical and especially so in an automated key cutting machine. A cost efficient and easy to assemble packaging solution to properly hold all the various keys to be offered in a vended key cutting machine is critical to an effective overall solution. Key sizes and shapes can vary tremendously and finding a uniform set of packaging formats, e.g., see formats 302 in FIGS. 3A and 3B, that covers a wide range of key products is a key consideration in arriving at an efficient storage matrix 200 and an effective gripper or clamping pick and place design (as described in reference to FIGS. 4A-4G. The number of box types and dimensions used in connection with the matrix 200 is preferably kept to a minimum (in the examples shown three and four packaging/cell types). Accordingly, the packaging solution and system should allow maximum flexibility across product range being offered within each machine, whilst maximizing space.

Figure 3A:
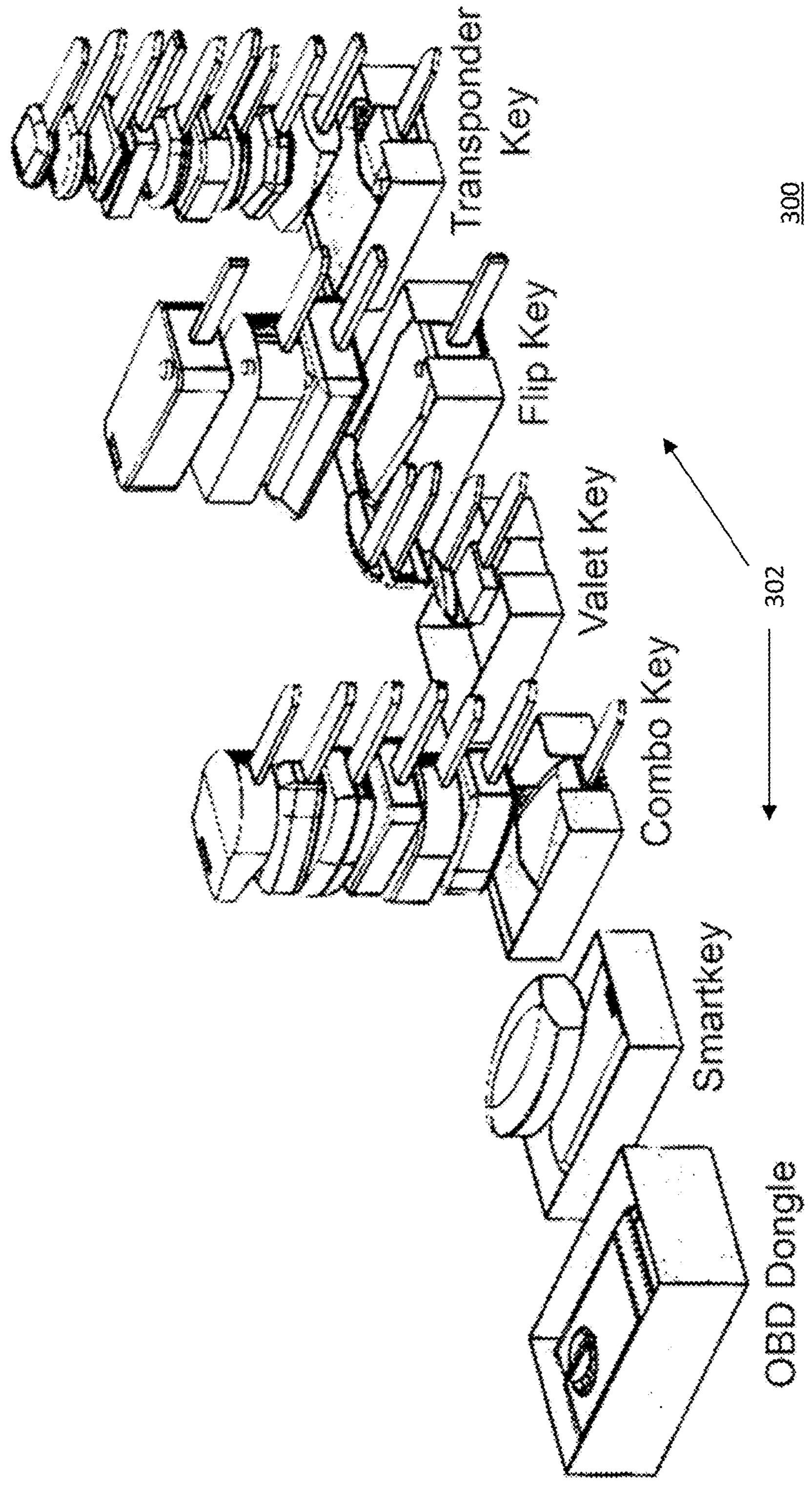
FIGS. 3A-3L provide a set of views of key blank product packaging, including the faux key blade feature, for use in a key cutting kiosk according to the key blank product packaging inventive aspect.
Figure 3B:
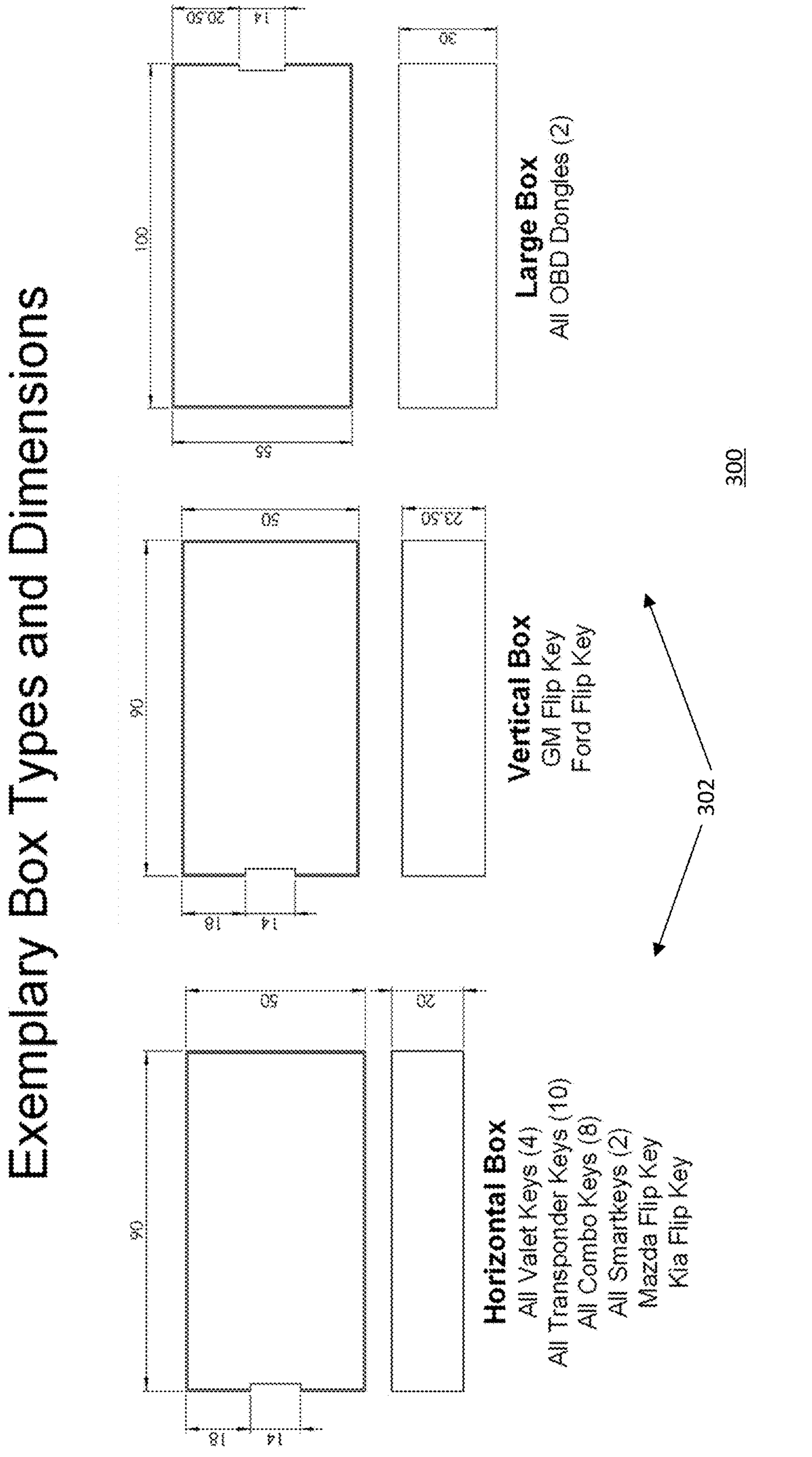
Figure 3E:
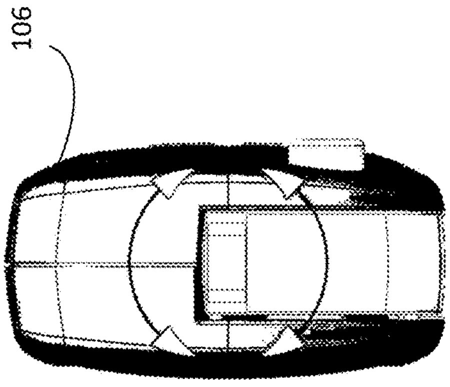
Figure 3D:
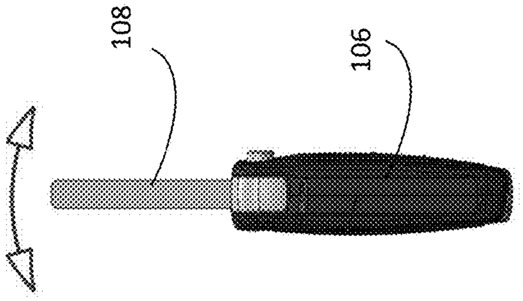
Figure 3F:
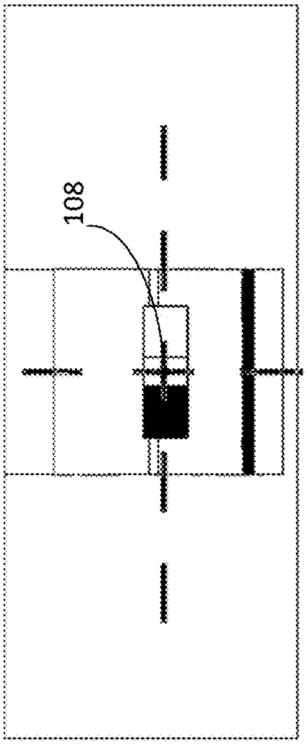
Figure 3C:
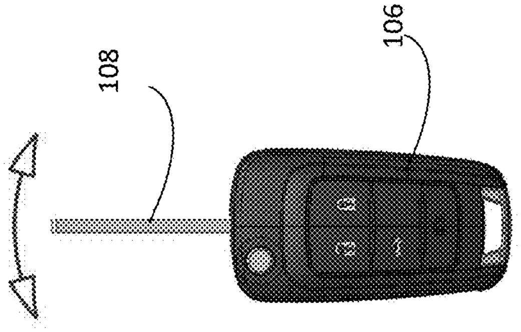

FIG. 3B illustrates three different packaging formats 302, including horizontal box, vertical box, and large box. FIGS. 3L-3N illustrate exemplary carton or package inserts configured to be received within outer cartons, e.g., such as shown in FIG. 3B, and adapted to be folded to with cavities and opening to receive and support key products stored within cartons and placed in the matrix 200. An example of a right-angle blade flip-key is shown at FIGS. 3C and 3D illustrating effects of yaw (FIG. 3C) and pitch (FIG. 3D). For retrieval purposes as described hereinbelow, the key blade extending from the package must be presented to the gripper/clamp so that there is minimal pitch, yaw, or roll. FIG. 3E illustrates the roll effect associated with bulky keys on flat scanning surfaces. FIG. 3F shows the X and Y axis crosshairs associated with reference to a key blade. For retrieval purposes, the key blade extending from the package must be closely-centered horizontally (x) and vertically (y) in the packaging whenever possible.

Figure 3G:
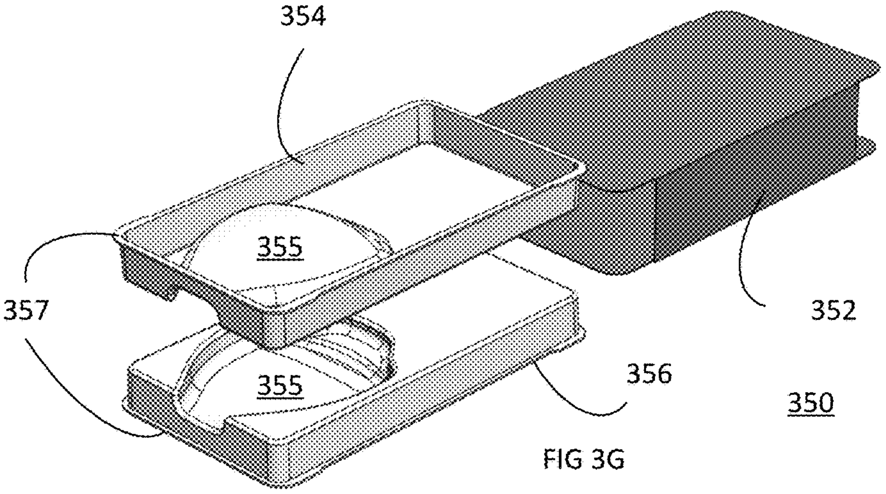
Figure 3H:
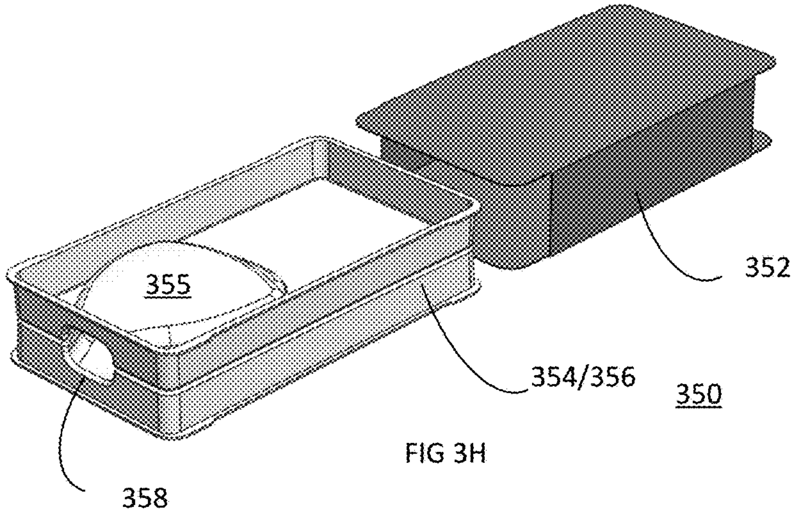
Figure 3I:
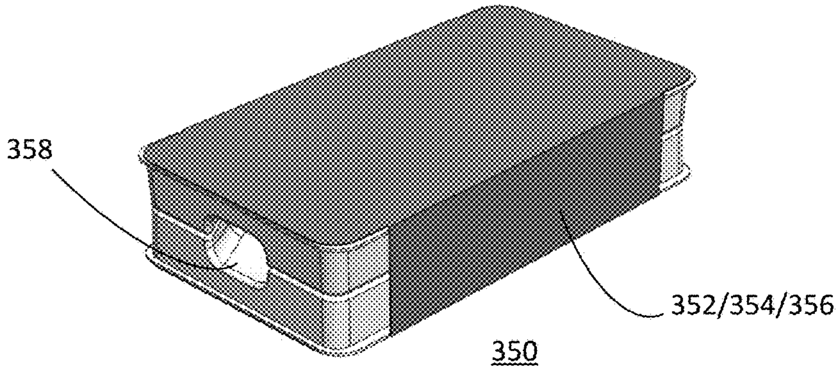

FIGS. 3G-3I illustrate a first form of packaging that includes an outer container or carton or sleeve 352 (such as made of cardboard or other suitable paper or other product) along with formed elements, as shown an upper key enclosure element 354 and a lower key enclosure element 356 having formed therein respective sets of thermoform tabs 357 (serve as a cardboard sleeve retaining feature). With the key base disposed inside deformations or wells 355, the upper key enclosure element 354 and lower key enclosure element 356 are joined to form a key enclosure 354/356 ready for insertion into the cavity formed in carton 352 as shown in FIG. 3H (without key present). One or more openings 358 are provided adjacent the key wells 355 to permit key blades to protrude from the completed package shown in FIG. 3I. Upon sliding the key enclosure into the carton the tabs 357 are configured to be just small enough to allow the sleeve 352 to pass over them. With the key enclosure 354/356 inserted into the sleeve cavity, the tabs 257 serve to retain the cardboard sleeve 352 in place as shown in FIG. 3I. Upon sufficient pulling force applied to the key enclosure 354/356, the key enclosure overcomes the retaining force of the tabs 357 acting against the side wall of the carton and is removed therefrom for accessing the key contained in the packaging. The two halves of the thermoform package may allow for deformation or flex to accomplish the gripper over-pushing described below.

Figure 3J:
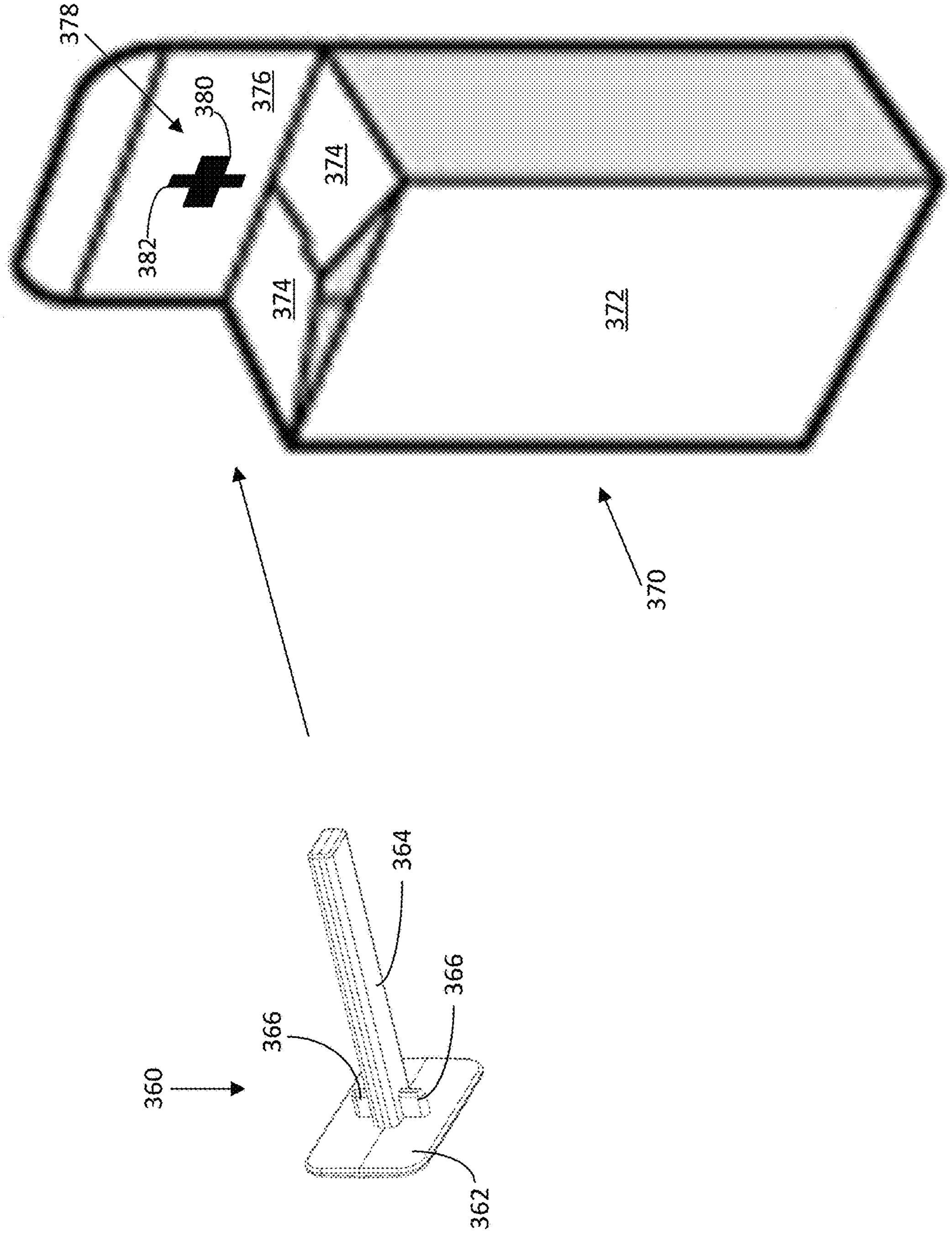
Figure 3K:
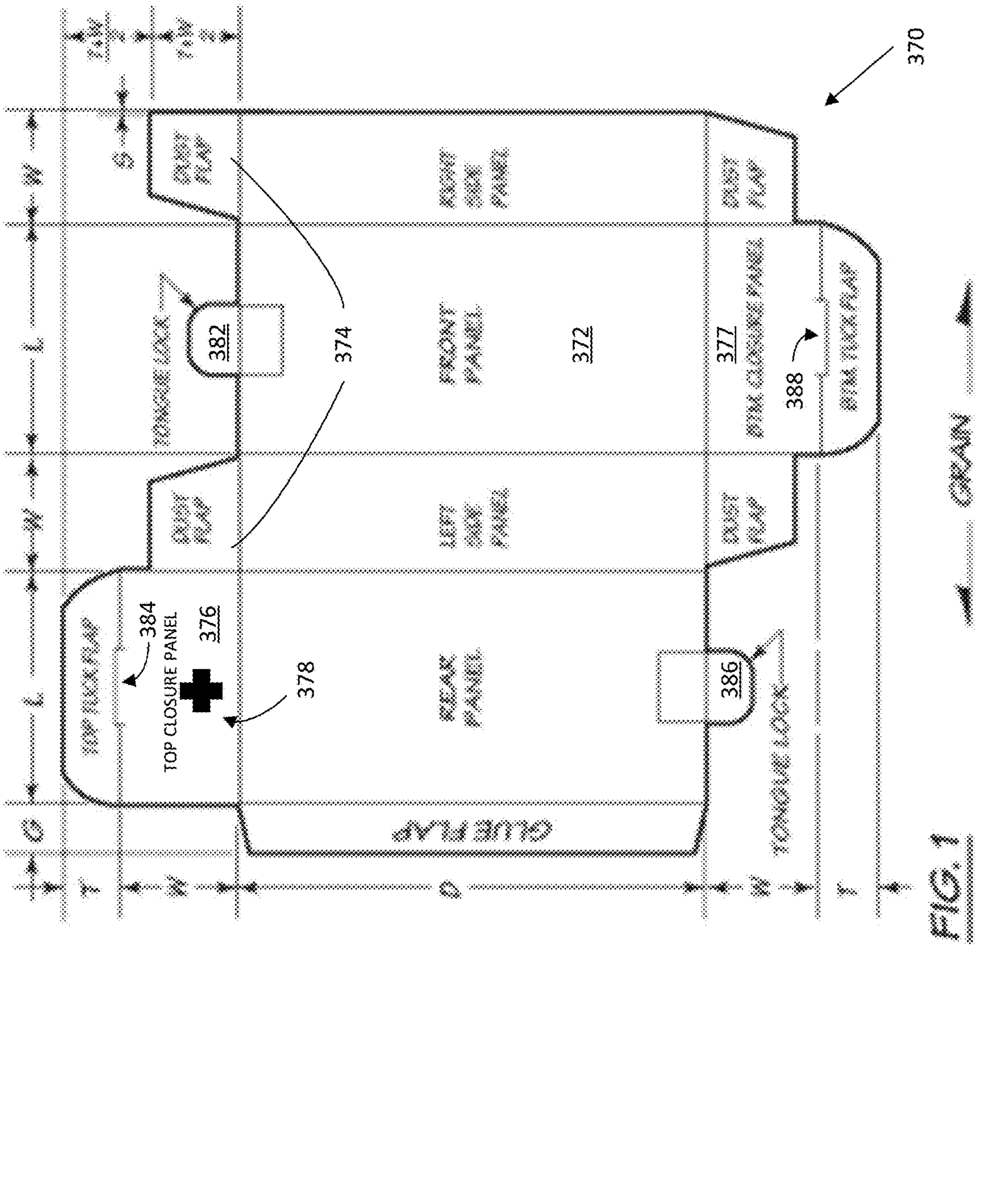
Figure 3L:
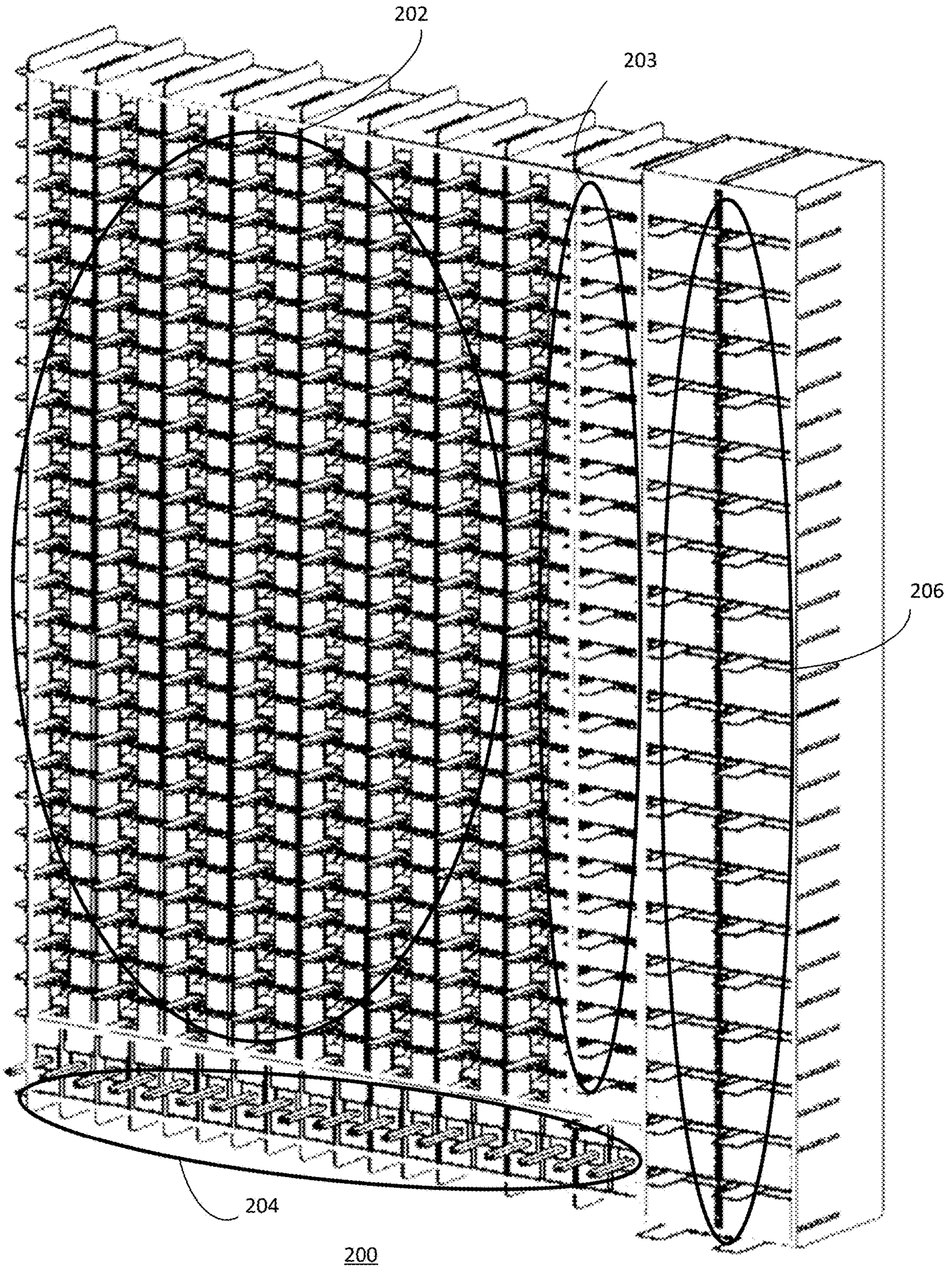

FIGS. 3J-3K illustrate a second packaging format in the fashion of a paperboard or cardboard-based "Origami" style carton or box or package for housing the key product for cutting and dispensing via the key cutting machine. As shown the key holding package 370 includes a main body 372, two pairs of (dust) flaps 374, a top cover or closure panel 376 having a tongue receiving slot 384 for receiving top or upper tongue 382, and a bottom cover or closure panel 377 having a tongue receiving slot 388 for receiving bottom or lower tongue 386. The package 370 may come unassembled in a flat state and may include a glue tab or side for mating one side of the package with the opposite side of the package. The various panels, flaps and tongues may be folded or otherwise positioned and received within slots and openings along edges to complete the assembly. As shown, a "plus" or cross-shaped opening 378 is provided in the top closure panel 376 and is sized appropriately to receive a key blade of a corresponding set of keys for housing within the package 372 and placement in the matrix 200.

The package 372 is in one example made of paperboard which has the attributes of low cost, adapted for direct printing, easy to fold/form/die cut, thereby making the design simple to assemble with perforated/creased sections to ensure consistent folds. Cardboard tuck tabs and mating slots are used to secure folded sections. Tuck Tabs have dual use in engaging in slots to hold structure together but also providing a backstop (i.e., feet) for faux blade insert to fit securely within the envelope of the box as discussed below. Additional support tabs may be provided for added support. The assembled design holds key in multiple area, centering key (i.e., holds true for yaw/pitch/roll effects.

One additional feature of the packaging inventive aspect is the provision of a "Faux Key Blade" for use in packaging of smartkeys and OBD Dongle products that do not have a key blade incorporated therein or is a detachable feature. The faux blade is, in one manner, a plastic blade that acts as the key blade for keys/products that do not have a physical key blade. These products include smartkeys and programming dongles. In one manner, the blade extends through one side of a "tuck" carton-type packaging and is sandwiched between flaps and the folded cover of the carton.

With reference to FIG. 3J, a Paperboard Key Retaining Support Insert arrangement is illustrated in connection with a fake or faux key blade 360 for use with smart keys that have detachable emergency keys or no blade at all as well as other key products such as programming dongles. As shown, faux key blade 360 includes a blade base portion 362, an elongated blade portion 364, and a pair of alignment protrusions or ears 366. The faux key blade 360 is configured to be inserted into and through the cross-shaped opening 378 formed in the top closure panel 376 of package or carton 372. The cross-shaped opening in this example includes a first slot 380 configured and sized to receive the blade member 364 and a second slot opening 382 configured and sized to receive the protrusions or ears 366. The faux blade insert 360 is inserted through the opening 378 and is sandwiched and supported by folding the top closure panel 376 and the tabs 374 and the top tuck flap with tongue lock 382. Additional package elements may be provided for additional support of the faux blade insert. The packaging should provide: a tab rigid enough to hold the box which is being extracted, horizontally and without droop; a tab made of a material which doesn't droop over time, especially in humid or damp conditions; and a tab being essentially the same size, shape and thickness of a target key blade (Guide dimensions 10 mm Wide×3 mm Deep×50 mm Length).

With reference to FIG. 3L, a matrix 200 is shown having assembled key product packages placed and stored in storage cells and showing key blades and faux key blades extending from the packaging. Here, each respective set of storage cells 202/203/204/206 has an associated dimension (height, depth and width) and key product packages are correspondingly sized to fit within the corresponding storage cells to maximize efficient storage and to ensure accurate mapping and location of the blade extending from the package for picking and placing by the product retrieval mechanism. For example, and as shown: storage cell set 202 is for housing horizontal format boxes containing Valet, Transponder, Combo, Mazda Flip and Kia Flip-keys (234 cells); storage cell set 203 is for housing horizontal format boxes containing Smartkeys (26 cells); storage cell set 206 is for housing large format boxes containing OBD Dongles (40 cells); and storage cell set 204 is for housing vertical format boxes having contained therein GM Flip and Ford Flip-keys (18 cells). Accordingly, it is critical for the package dimensions once assembled to match closely with the dimensions of the storage cell in which it is intended to be received, stored and removed.

Figure 4A:
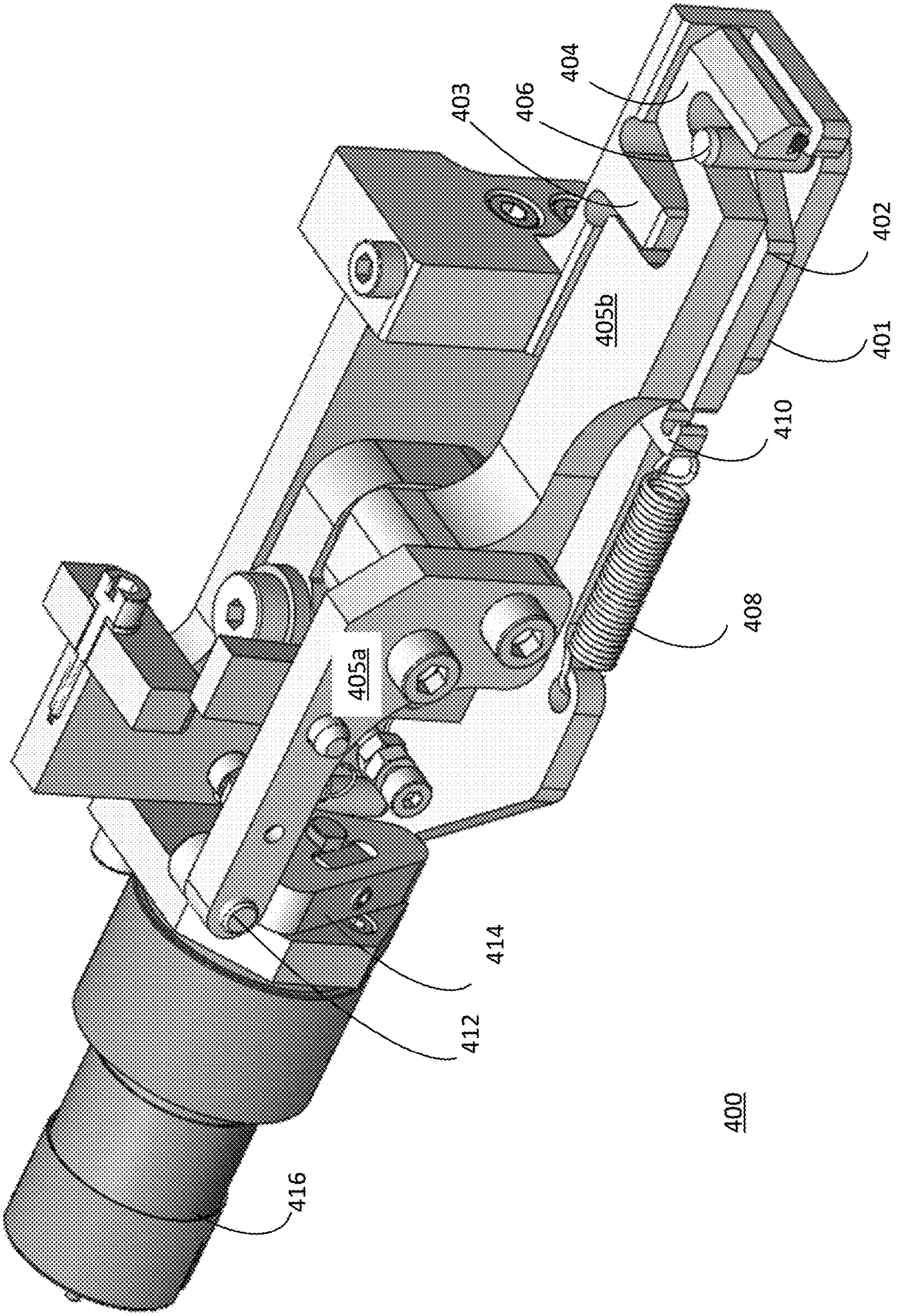
FIGS. 4A-4G provide a set of views of a gripper mechanism for use in a key cutting kiosk according to the gripper mechanism inventive aspect.
Figure 4B:
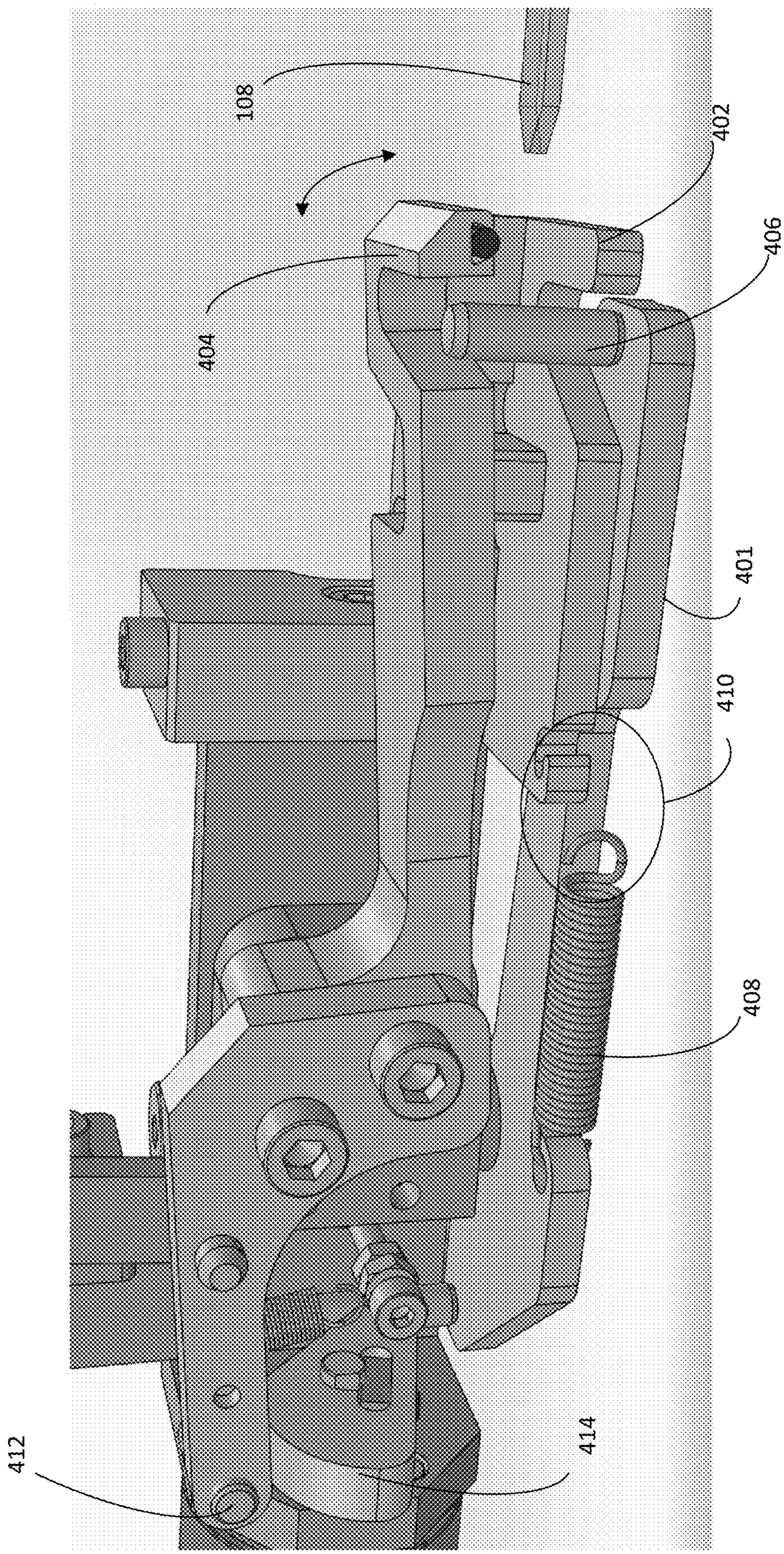
Figure 4D:
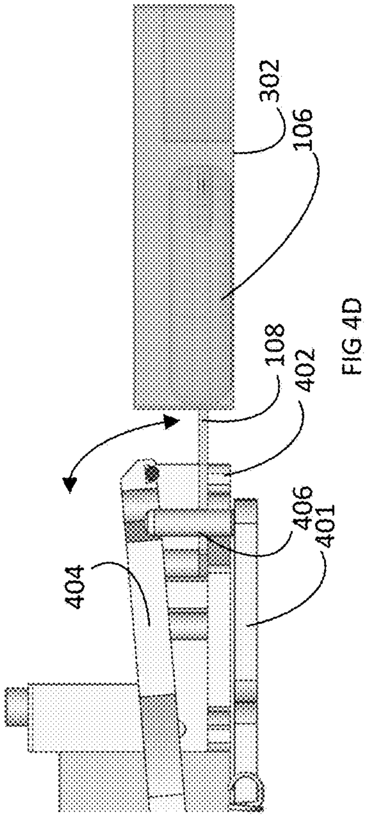

With reference to FIGS. 4A-4G, a set of views illustrate a gripper or clamping mechanism 400 for use in a key cutting kiosk according to the gripper mechanism inventive aspect. As mentioned previously, because of the relative looseness of the carton/folded insert product fit, the key blade as it extends from the carton is not presented perfectly (level, true, same tip position, etc.) to the gripper for picking. Preferably the key product gripper is adapted for some amount of tolerance as to gripping or picking a key blade protruding from a key product stored in the matrix. In one exemplary manner, the packaging and/or gripper arrangement allow for a range of mis-location, e.g., a maximum of 5 mm movement of the tip in any direction (up-down, side to side, pitch, roll, yaw, canted blade angle, etc.) and allow for a large roll angle. Preferably, the gripper is designed to open like a jaw or mouth to provide an expansive target for receiving the key blade, and a mechanism to close on the key blade to properly orient the key blade for accurate picking, retrieval and placement or delivery to the cutting section. FIG. 4B shows the gripper 400 in an open position for receiving and aligning with a key blade protruding from a carton stored in the matrix. FIG. 4A shows the gripper in the close position as it would be when engaging or clamping down and around a key blade.

As shown in FIGS. 4A-4F, key product gripping device or mechanism or assembly 400 includes at its forward portion a spring-biased key blade positioner member 401 having a vertical, cylindrical key blade positioning pin 406 extending upward therefrom, a rubber key blade engagement member 407 for enhanced gripping, a biasing spring 408, a fixed lower jaw or member 402 having a key blade tip stop 403, and an upper jaw member 404 comprising an upper jaw rear arm 405*a* and an upper jaw forward arm 405*b*. A gripper motor 416 is located at the rear of the mechanism 400 and is connected to and causes rotation of a cam member 414 engaging with the upper jaw rear arm causing it to pivot at a pivot point 412 to cause the upper jaw 404 to open and close relative to the fixed lower jaw member 402 at the forward portion of the gripper to engage and disengage with key blades or faux key blades extending from packages stored in storage matrix 200. The upper jaw 404 closes and clamps down on the key blade in cooperation with the fixed lower jaw member 402 to flatten the key blade in the gripper. The vertical pin 406 and the vertical wall of stop 403 act to straighten the key for further alignment during gripping. In all, skew, roll or tilt (e.g., up to 15 degrees), pitch and yaw of the key are corrected. The cam 414, along with spring biasing members, adjusts both the upper jaw and lower jaw from open to closed positions. FIG. 4A shows the gripper in a closed position and FIG. 4B shows the gripper in an open position for receiving a key blade 108 extending from a package stored in the storage matrix 200. As shown, during "gripping" or retrieval operation, the spring-biased key blade positioner 401 is deflected outward from the fixed lower jaw member 402 to provide clearance for receiving blade 108. Once the blade is inserted the positioner 401 closes and the vertical key blade engagement or positioning pin 406 comes into contact with the edge of the key blade 108 and pushes it against the opposite vertical wall of jaw member and stop 403 to engage, grip and position the key product for retrieval and movement within the key cutting machine. When the key blade is released the positioner and pin return to a closed position.

Figure 4F:
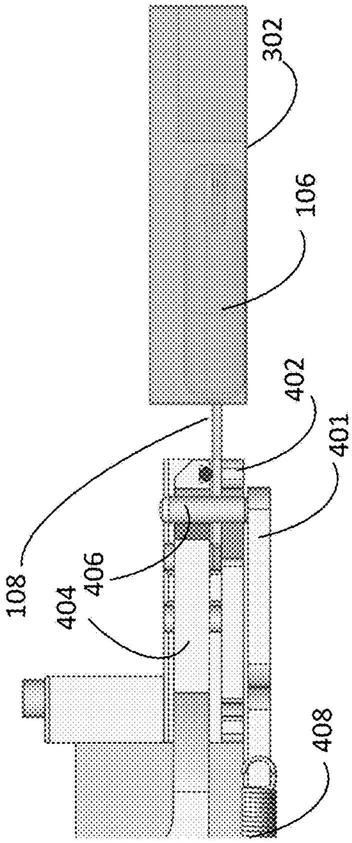
Figure 4C:
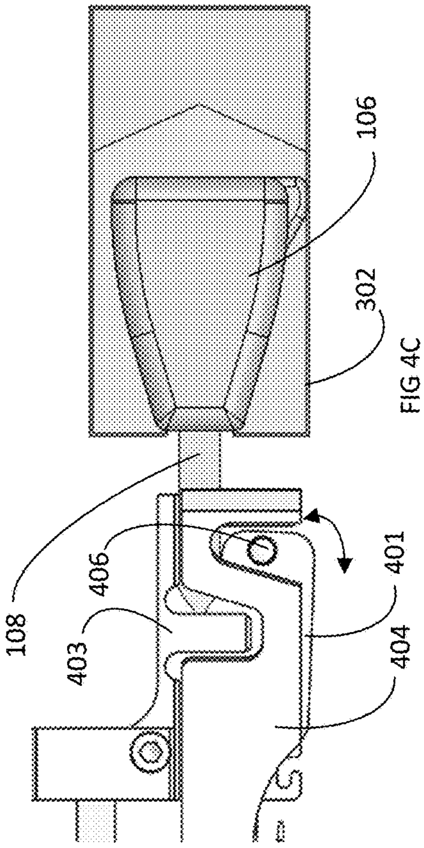
Figure 4E:
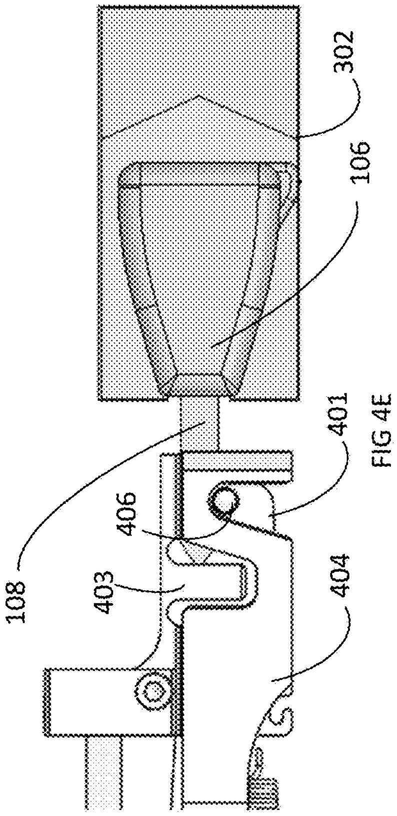

FIG. 4C is a downward facing view of the front or forward portion of the gripper 400 having inserted therein a key blade 108 of a key 106 shown in packaging 302. Positioner 401 is deflected outward in an open condition and pin 406 is not in contact with the blade 108. As shown in the corresponding side view of FIG. 4D, the gripper upper jaw 404 is raised in an open position with the blade 108 inserted in the clamp. As shown in FIG. 4E, the positioner 401 is closed and pin 406 is engaged with the edge of blade 108 with the tip end of the blade in contact with the stop 403 of the fixed lower jaw 402. As shown in FIG. 4F, the upper jaw 404 of the gripper is lowered and closed and is engagement with the key blade 108 and the gripper 400 is ready to remove the key product from the matrix for delivery to the cutting section or for dispensing to the customer.

Figure 4G:
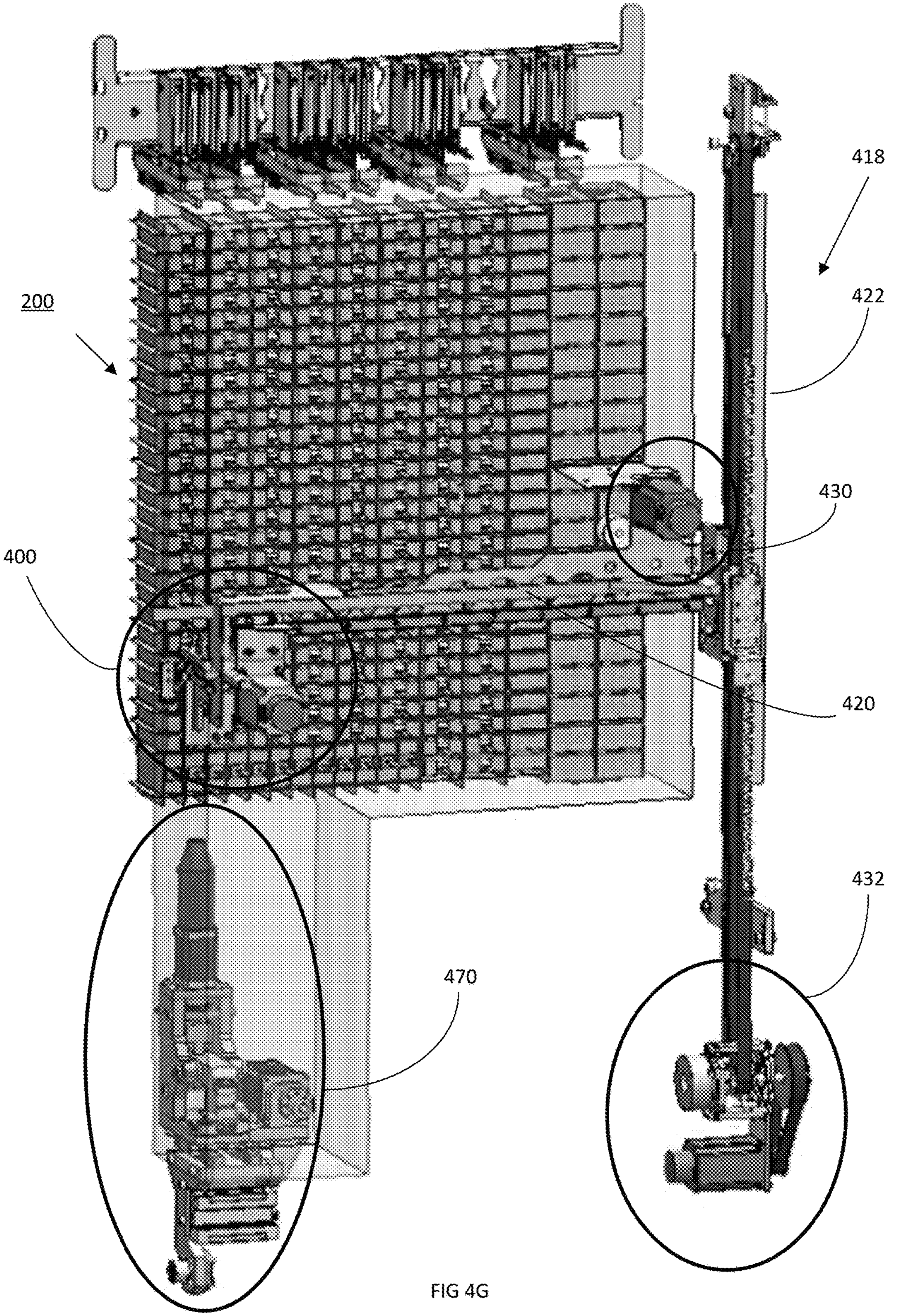

As shown in FIG. 4G, a key product retrieval assembly or system 418 is shown including the gripper mechanism 400, vertical track 420, horizontal track 422, vertical track motor 430, horizontal track motor 432, and matrix 200 having stored therein key product cartons or boxes. The tracking and associated motors provide a two-dimensional gantry system for moving the gripper mechanism across all points and cells of the matrix 200. The gripper or clamping assembly 450 includes two distinct gripping mechanisms or components, a residential gripper mechanism 451 and an automotive gripper mechanism 400 (not shown obscured by motor 416). The gripper or key clamping assembly 450 is intended for movement along the gantry system to move to a specific pigeonhole or storage cell and grip or pick a desired key product stored in the target storage cell based on a matrix mapping table as accessed by a processor and program running on the key cutting machine. The gripper retrieves the key product by moving into position and gripping the key box by the protruding key blade. Software is used to compensate for any predetermined x or y offset of the protruding blade from the center of the face of the box. Motors drive the gripper (clamp) along tracks in the X and Y directions to the location of the desired key product or selected SKU. The gripper assembly 450 is moved by motor 416 in a third direction along the Z axis to engage the key products stored in the matrix. In one manner, the automotive gripper mechanism 400 "over-pushes" when engaging the key blade to ensure the tip of the key blade 108 abuts the stop 403 of the gripper, e.g., as shown in FIGS. 4C-4F. For example, the gripper and associated motors may be designed to over-push the key blade a distance of 2 mm to confirm proper engagement of the key blade tip with the stop 403. The cardboard packaging, either the outer carton or the inner insert, is designed to permit a degree of flex to ensure over-push may occur without damaging the key or key blade. Likewise, the thermoform plastic or foam material in the alternative packaging may be designed to permit a degree of flexing, e.g., 2 mm, for over-pushing. A more expensive alternative is to have a sensor associated with one of the assemblies to sense and determine contact of the key blade tip with the stop 403. Also, the pigeonhole or cell may allow for movement of the package stored therein to allow for over-pushing by the gripper. Then the gripper clamps down and along the sides the key blade (or tab) to retrieve the SKU. The gripper mechanism can then move the selected and retrieved key product and deliver same to the key cutting section 470 for cutting the key blade based on the imaged or scanned data obtained from the master key. After cutting operations the key may then be delivered to the customer. This dual-gripper on a common gantry with a common Z-axis motor and linkage is a highly efficient system for providing dual cutting of both residential type keys and automotive type keys. The dual gripper operates so residential gripper mechanism 451 is moved by the gantry system to pick or retrieve residential keys stored in a set of stacked key cartridges in residential key storage section 452. The gripper assembly and matrix storage assembly must be configured to provide gaps or clearances to allow the respective gripper mechanisms to move from location to location with out colliding into keys or key products and to move forward and backward when retrieving key products. Note the residential gripper may also include two residential key gripper components—one for cylinder-type keys and one for lever-type keys.

After the key product is picked or retrieved by the gripper, it is delivered to the cutting section which has a clamp or the like that also engages the blade preferably within 2 mm of the head or base or body of the key. It is critical for the cutting section to have a clamp designed to allow for the dimensions of the key product packaging—e.g., the carton in which the key is stored. The gripper moves away from the cutting section for cutting operation.

Figure 5:
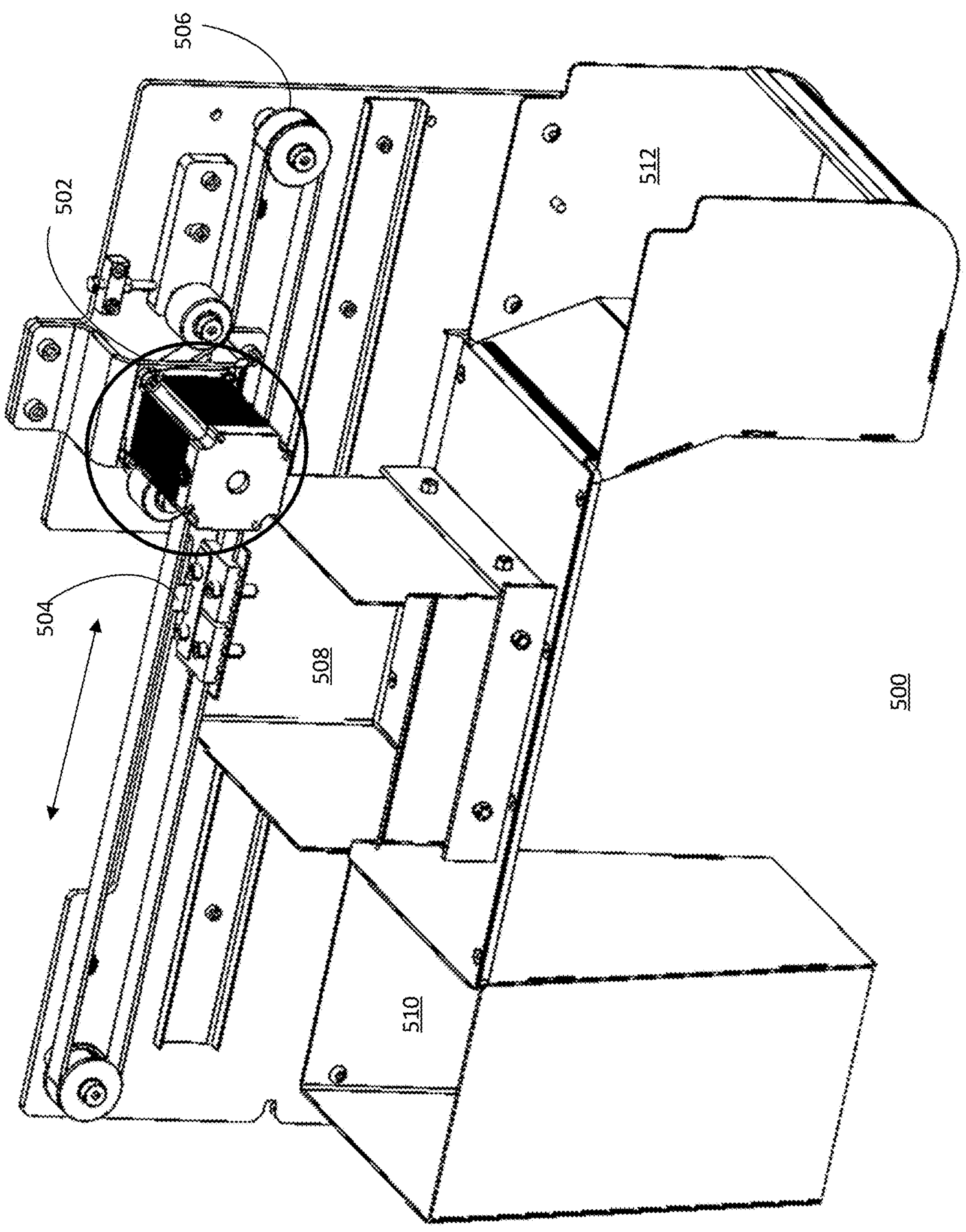
FIG. 5 provides a front perspective view of an embodiment of a key scanning and cutting system according to the product escrowing inventive aspect.

With reference to FIG. 5, a front perspective view illustrates an escrowing configuration for use in a key scanning and cutting system according to the product escrowing inventive aspect. In situations where a customer has multiple key product requests, the escrow system provides an effective way for limiting risk, avoiding stolen items, avoiding multiple transactions, and reducing processing time by processing multiple orders in a single transaction. As shown, the escrow system 500 includes a motor 502 operated to move a key product conveying unit 504 along a belt track 506 to deposit transported products into one or more of an escrow delivery bin 508, where keys are deposited after a cutting operation, return bin 510 for non-delivery and a delivery chute 512 for customer delivery. The escrow system 500 allows the system to process multiple items in one transaction. The point of the escrow bin is to ensure all items are successfully cut and delivered to the escrow bin before delivering to the customer and charging their credit card. If there is a failure, we simply transfer any items in the Delivery Bin to the Return Bin. The next time someone does a maintenance run on the machine, the employee will disposition each item based on its condition (i.e., dispose of cut keys, returning of undamaged dongles/smartkeys, and determining root cause of the failure that occurred).

The Escrow delivery system 500 is designed to hold, then deliver all products to customer in single drop/transaction. For example, the system can accommodate three boxes for automotive (one emergency key, one smartkey, and a Dongle) plus many residential keys. This helps to limit risk of stolen products. In one manner, the system may permit cutting of residential keys first. With residential, the system may cut and deliver all residential keys as they are ready or escrow them by master key (batch copy escrow), or escrow all batches, then cut and deliver only one copy of automotive at the end.

Figure 6:
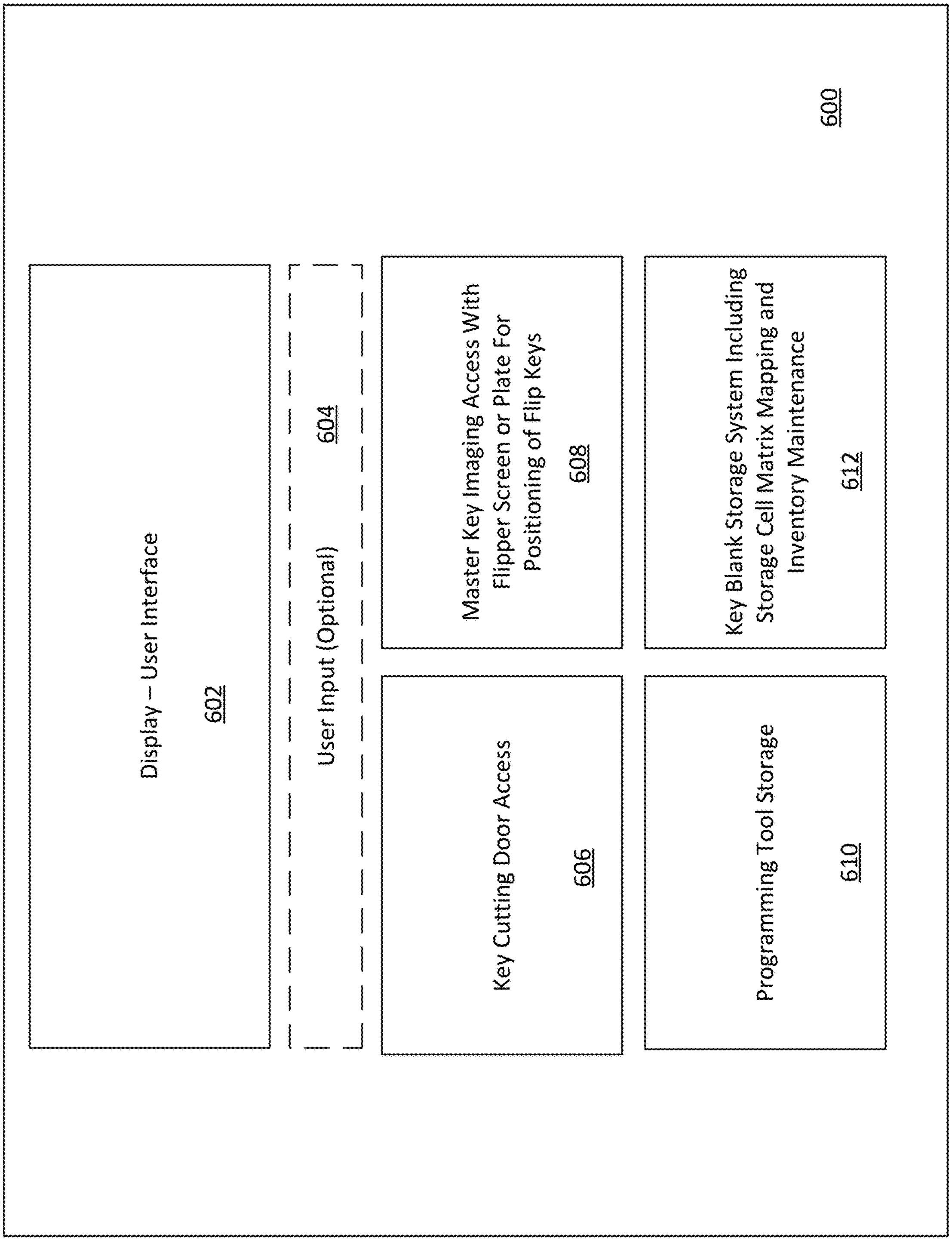
FIG. 6 provides a schematic diagram of a kiosk or stand-alone key cutting machine providing operations and processes for imaging and identifying a master key (including a flipper screen or plate for positioning of flip-keys), storing key blanks (including storage cell matrix mapping and inventory maintenance), duplicating the master key and cutting a key blank, and pairing a duplicate key with a vehicle according to the present inventive aspects.

With reference to FIG. 6, a schematic diagram illustrates exemplary componentry in a kiosk or stand-alone key cutting machine illustrates a user-interface driven process for identifying a master key, duplicating the master key and cutting a key blank, and pairing a duplicate key with a vehicle according to the present invention. Here, the key cutting machine or kiosk 600 includes a display 602 adapted to present a series of user interfaces for interaction with users, including customers and sales representatives. The display may be a touch screen type device capable of interpreting hand touches on the screen for receiving user inputs and selections. Optionally a separate user input device 604 may be provide such as an alpha-numeric keypad or keyboard. A key cutting compartment 606 may include a lockable door for securing the contents and key cutting components contained in the kiosk 600. One or more key holding components are provided for placement of key blanks within the key cutting compartment 606 for cutting operation. An original or "master" key imaging compartment 608 may also include a lockable door and provides a scanning surface area for placement of a master key for scanning and duplication. A vision system including one or more lasers and cameras are provide for inspecting and imaging the master key. Indicia are provided for proper placement of the master key. A programming too storage compartment 610 contains one or more programming tools for either cloning duplicate keys from master keys or for pairing duplicate keys with target vehicles. A key blank storage compartment 612 is provided to house key blank inventory. Lockable doors may be provided for one or both of the programming tool and key blank storage compartments.

Figure 7:
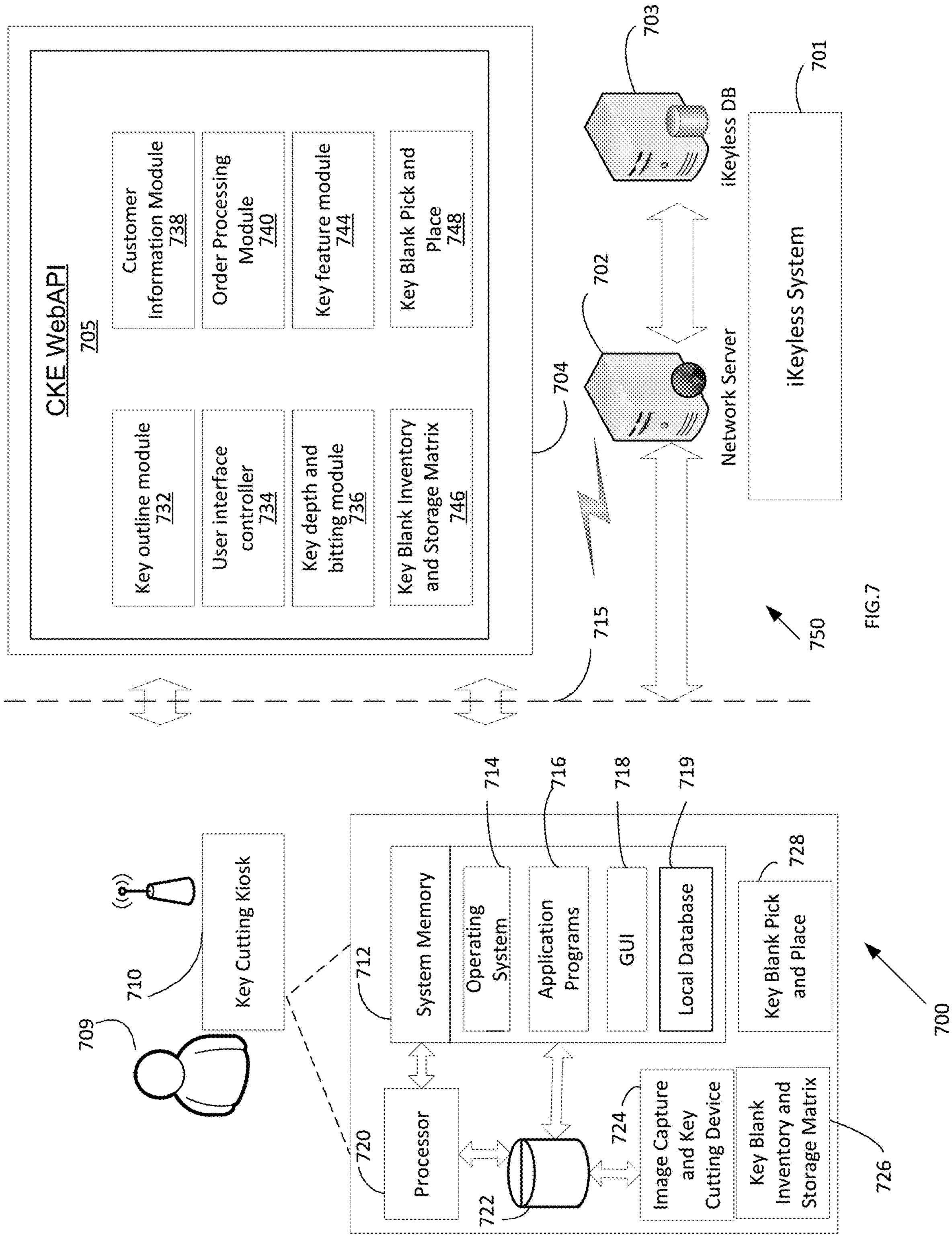
FIG. 7 provides a schematic diagram of an exemplary system architecture configured to provide an automated approach to Key Blank Inventory and Storage Matrix mapping and Key Blank Pick and Place operations and processes for identifying a master key, duplicating the master key and cutting a key blank, and pairing a duplicate key with a vehicle and for connecting to remote devices for exchanging data according to the present inventive aspects.

In accordance with the present inventive aspects, FIG. 6 illustrates a kiosk or stand-alone key cutting machine 600 providing operations and processes for imaging and identifying a master key (including a flipper screen or plate for positioning of flip-keys as described in connection with FIGS. 1A-1C), storing key blanks (including storage cell matrix mapping and inventory maintenance as described in connection with), duplicating the master key and cutting a key blank, and pairing a duplicate key with a vehicle according to the present inventive aspects FIG. 7 provides a schematic diagram of an exemplary system architecture configured to provide a user-interface driven process for identifying a master key, duplicating the master key and cutting a key blank, using the laser/image-driven system and processes described above. The system 700 may further include methods and processes enabling a user 709 to pair a duplicated key with a vehicle and connect to remote devices for exchanging data. With reference to FIG. 11, a system diagram for a system 700 for creating replacement vehicle keys according to the present invention is provided. The system 700 includes a kiosk or stand-alone key cutting station 710 such as described herein for being located at retail outlets, e.g., auto parts stores, big box stores, grocery stores and other facilities where key cutting services is desired. The key cutting kiosk may be connected to a central key cutting service operation, such as iKeyless System 701 over a communications network 715 for continuous or occasional connection to upload and/or download data and instructions associated with key cutting operation. The kiosk 710 may also be configured to connect with mobile devices or other computing devices for local access and manipulation.

The system 700 includes, for example, an iKeyless or Car Keys Express WebAPI (Web Application Program Interface) 705 which may be part of a system environment 704 run on network server 702 and is the conduit, or interface, through which the remote kiosk 710 and the iKeyless System 701 sends and receives information to/from the iKeyless DB 703. The network server 702 may be in communication with the iKeyless database 703 which stores information used by the iKeyless System 701, including OEM key data for use by kiosk 710 and other connected machines to assist in making duplicate keys and in pairing keys with vehicles. For example, OEM and other key recognition information may be updated from time to time to freshen data stored locally at the kiosk 710. Also, transaction data associated with key cutting operations may be stored locally at the kiosk 710 and uploaded to System 701 such as for use in auditing sales data, inventory maintenance, machine maintenance, customer data and other valuable uses. The kiosk 710 may comprise a processor and a non-transitory memory which stores instructions that, when executed by the processor, transform the kiosk into a special purpose machine for key cutting operation. The iKeyless System 701 further comprises a key outline module 732, a customer information module 738, a user interface controller 734, an order processing module 740, a key depth and bitting module 736, and a key feature module 744, the features of which are discussed in further detail hereinbelow. The modules shown in system 704 may also, or a variation thereof, be stored locally at kiosk 710 for use in key cutting operations.

In accordance with the present inventive aspects, programs or routines or sets of executable instructions for Key Blank Inventory and Storage Matrix mapping 746 and Key Blank Pick and Place 748 are included in the CKE WebAPI 705 and is part of the system environment 704 run on network server 702, which collectively serve as the conduit, or interface, through which the remote kiosk 710 and the iKeyless System 701 sends and receives information to and from the iKeyless DB 703. The network server 702 may be in communication with the iKeyless database 703 which stores information used by the iKeyless System 701, including data and instructions related to Key Blank Inventory and Storage Matrix mapping 746 and Key Blank Pick and Place 748. For example, storage matrix mapping, e.g., look-up table data and configuration, may be stored centrally and downloaded to a plurality of remote kiosk machines 710, which may then require reconfiguration of the corresponding physical storage cell matrix of the machines and revisions to the locations of stored key blank products. In addition, inventory data may be stored centrally and updated from the remote kiosk machines 710 from time to time to update availability of inventory based on sales of products. The central facility may then schedule product replenishment without having to physically examine the contents of the key cutting machines. In the instance of revisions to the storage matrix mapping and related look-up table, then the Key Blank Pick and Place 748 may also be revised, which revisions may then be downloaded via a communications network to the corresponding local applications, e.g., Key Blank Inventory and Storage Matrix mapping 726 and Key Blank Pick and Place 728, stored in the memory 712 and running on the local remote machines 710.

The program or routine or set of executable instructions for Key Blank Inventory and Storage Matrix mapping 726 is configured and adapted to identify, locate and map the locations and layout of storage cells associated with the storage matrix 200 and key blank products stored therein as described above and in connection with FIGS. 2A-2E, 3L, and 4G. The program or routine or set of executable instructions for Key Blank Pick and Place 728 is configured for operations involving the gripper mechanism or assembly 400 and associated components of the key cutting machine as described above and in connection with FIGS. 4A-4G.

With the iKeyless System 701 in communication over communications network 715, such as a local area network, wide area network, or the Internet, with a distributed network of remote key cutting kiosks 710, data from the connected kiosks may be collected locally and maintenance may be performed in batch fashion to provide a network wide updating of programming and database assets. Each remote kiosk 710 is operated locally by a user 709, which may be a customer and/or a sales or service employee of the facility housing the kiosk. The remote kiosk 710 comprises a processor 720, system memory 712, local storage 722, and an image capture and key cutting device 724. Programs and software are loaded from the local storage 722 into the system memory 712 and may comprise an operating system 714, application programs 716, a graphical user interface ("GUI") 718, and local database 719. The GUIs stored at the kiosk include the user interfaces described herein.

In accordance with the present inventive aspects, programs or routines or sets of executable instructions for Key Blank Inventory and Storage Matrix mapping 726 and Key Blank Pick and Place 728 are stored in the memory 712 and executed by the processor 720. The program or routine or set of executable instructions for Key Blank Inventory and Storage Matrix mapping 726 is configured and adapted to identify, locate and map the locations and layout of storage cells associated with the storage matrix 200 and key blank products stored therein as described above and in connection with FIGS. 2A-2E, 3L, and 4G. The program or routine or set of executable instructions for Key Blank Pick and Place 728 is configured for operations involving the gripper mechanism and associated components of the key cutting machine as described above and in connection with FIGS. 4A-4G.

An application program 716 communicates with the local database 719 and provides a graphical user interface 718 that comprises a set of user interface elements for interacting with the application program. The WebAPI 705 provides a secure encrypted interface, exposed to the web, to/from which the remote access device application can send commands/requests and receive responses.

For example, the kiosk presents user interface 718 to a user 709 and receives information from the user to identify keys and select matching key blanks for copying and for handling programming and pairing of keys with vehicles. The image capture and key cutting device 724 includes laser and image capturing devices, such as for positioning and locating key features, and is adapted to capture images of master keys to be duplicated and applies image detecting, laser projection and processing algorithms to determine information, e.g., bitting information, about the master key, as is described hereinabove. The algorithms may include: the automatic detection of key features (e.g., tip, shoulder (if applicable), bottom, top, blade width, shoulder to tip distance); the auto-registration of a key image including the auto-rotation of the key, skew detection and auto-adjustment (detection of non-parallel key features) and auto-correction, stretch/compression detection (using, for example, known rules of shoulder to tip distance and blade width) and auto-correction; automatic detection of cut depths with comparison to the nominal cut depths for the detected bitting; automatic detection of key features and key bit cut depths that break key rules; and the comparison of key bitting of multiple pictures at once to verify bittings are the same through a series of photos.

The automatic algorithms can, without manual manipulation, extract key cut depths and key bitting data with a high degree of accuracy. Images captured and used for extracting key information including bitting information may be saved and stored. Key cutting and transaction data may be exported from the kiosk 710 via the iKeyless WebAPI 705 for centralized use.

Key cutting and pairing operation may also include use of a mobile application, e.g., compatible and compliant with Apple iOS and/or Android standards, downloadable on customer or sales personnel smart phones. The user may connect, such as with Bluetooth, with a programming device and handle pairing operations via instructions provided on their phone. Key information may be stored and uploaded to the central database 703 for later use, e.g., making additional duplicate keys without the need for a master key being present. This may be particularly useful in fleet management situations or when a user loses the master key. The mobile application may interface, e.g., via the iKeyless WebAPI 705, to allow encrypted exchange of information, including a user interface for a user to create a new account or log into existing account, access previous orders for review of order progress or to re-order, take pictures of existing key, buy new keys, and buy upgrades to previous or existing key products. A user may order automotive keys or house keys through the mobile application.

Processing of the image or images of the master key to be copied comprises evaluating the image according to key bitting rules and determining if the key bittings determined from the image or images are within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A master set of actual or "valid" key codes within a set of potential codes associated with key bitting positions and depths may be used to ascertain if acquired master key data is valid. If the captured image and associated data do not match an actual valid key code for an identified make, model and year for a vehicle then the system can issue a warning and stop short of cutting a duplicate key.

Figure 8:
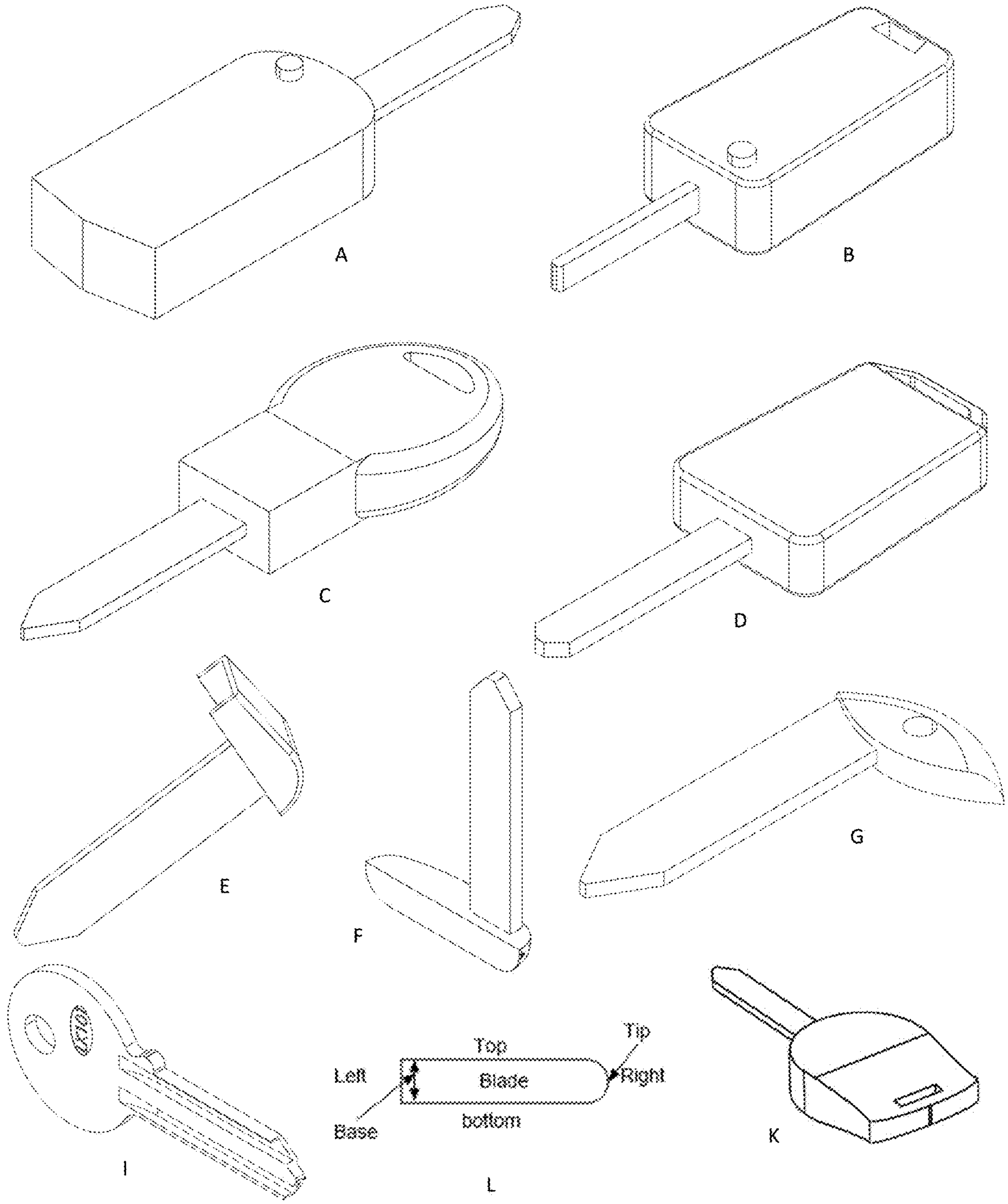
FIG. 8 provides a series of perspective views A-G, I, and K-L of exemplary key types for use with the key blank storage matrix and mapping and key scanning and cutting system of the present inventive aspects.

FIG. 8 provides illustrations A-G, I, and K-L of a variety of typical keys and keyblades for which the key holder assembly is configured or adapted to receive. Illustration L provides a general scheme typically used to describe components or areas of keys and keyblades and as may be stored in exemplary key stock storage systems as described hereinabove used to make duplicate keys with the key scanning and cutting system of the present invention.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A key cutting machine for making duplicate keys, the key cutting machine comprising:

a key storage matrix comprising a mapped system of storage cells for storing keys;

a key retrieval system comprising at least one motor or actuator for moving a gripper mechanism along a two-dimensional axis to a target storage cell location along the key storage matrix to pick a target key known to be stored in the target storage cell location;

each storage cell adapted to contain a single packaged key for accessing by the key retrieval system;

wherein the storage matrix comprises a first set of storage cells configured to receive first key packaging of first packaging dimensions and a second set of storage cells configured to receive second key packaging of second packaging dimensions different than the first packaging dimensions, the first set of storage cells having first cell dimensions that accommodate the first packaging dimensions, and the second set of storage cells having second cell dimensions that accommodate the second packaging dimensions and that are different than the first cell dimensions.

2. The key cutting machine of claim 1, wherein the retrieval system further comprises a first track oriented along a horizontal axis and a second track oriented along a vertical axis and wherein the storage cells are mapped to points along the horizontal axis and vertical axis.

3. The key cutting machine of claim 1, further comprising:

a key cutter configured to cut blank key blades based on a master key;

a scannable surface adapted to support the master key for imaging;

an imaging device adapted to capture images associated with the master key;

a retractable key slot adapted to receive the master key upon the master key being identified as a flip-key type key blade;

wherein the retractable key slot receives and supports the flip-key type key blade and positions the received master flip-key key blade in a desired position over the scannable surface for imaging.

4. The key cutting machine of claim 3, wherein the retractable key slot comprises a cover configured to pivot about a pivot point between a deployed position, for receiving and supporting the master key and over the scannable surface, and a stored position clear of the scannable surface.

5. The key cutting machine of claim 1 further comprising:

a key escrow system comprising:

a motor or actuator operated to move a key conveying unit along a track or gantry to deposit transported keys into a set of bins, the set of bins comprising:

an escrow delivery bin adapted to receive keys after a cutting operation;

a return bin adapted to receive products determined to be non-deliverable; and a delivery chute adapted to deliver keys to customers;

wherein the escrow system processes multiple keys in a single transaction.

6. The key cutting machine of claim 1 further comprising a packaging system for use in connection with the key storage matrix comprising a plurality of storage cells, the packaging system comprising:

a first key package having first packaging dimensions configured to accommodate a first set of keys; and a second key package having second packaging dimensions configured to accommodate a second set of keys, the second packaging dimensions being different than the first packaging dimensions and the second set of keys being different than the first set of keys;

each of the first and second key package having a blade access through which a key blade of a key contained in the respective key package extends whereby at least a portion of the key blade is exposed and protrudes outside the respective key package;

wherein the first packaging dimensions are selected so that the first key package is capable of being received in a close-fitting but removable fashion within the first set of storage cells, and the second packaging dimensions are selected so that the second key package is capable of being received in a close-fitting but removable fashion within the second set of storage cells.

7. The key cutting machine of claim 6 further comprising a faux blade insert adapted to be received in and through the blade access of the first or second package and whereby at least a portion of the faux blade insert is exposed and outside the first or second package.

8. The key cutting machine of claim 1 wherein the key retrieval system comprises:

the gripper mechanism comprising a set of jaw members for receiving a key blade, an actuator for causing the pair of jaw members to reposition relative to one another between an open and a closed position, a key blade positioner adapted to position a key blade received by the jaw members in a desired orientation;

the at least one motor or actuator for moving the gripper mechanism along a two-dimensional axis to the target storage cell location along the key storage matrix to pick the target key known to be stored in the target storage cell;

a set of keys stored in a set of respective storage cells of the key storage matrix, the set of keys comprising packaging characterized by having at least a portion of a key blade of a key extending outward from the key package and accessible by the gripper mechanism.

* * * * *